Sept. 20, 1971   C. W. ROBINSON ET AL   3,606,479
METHOD AND APPARATUS FOR THE STORAGE AND PULPING OF
MATERIAL ORES AND COMPARABLE PARTICULATE MATTER
Filed July 10, 1969   13 Sheets-Sheet 1
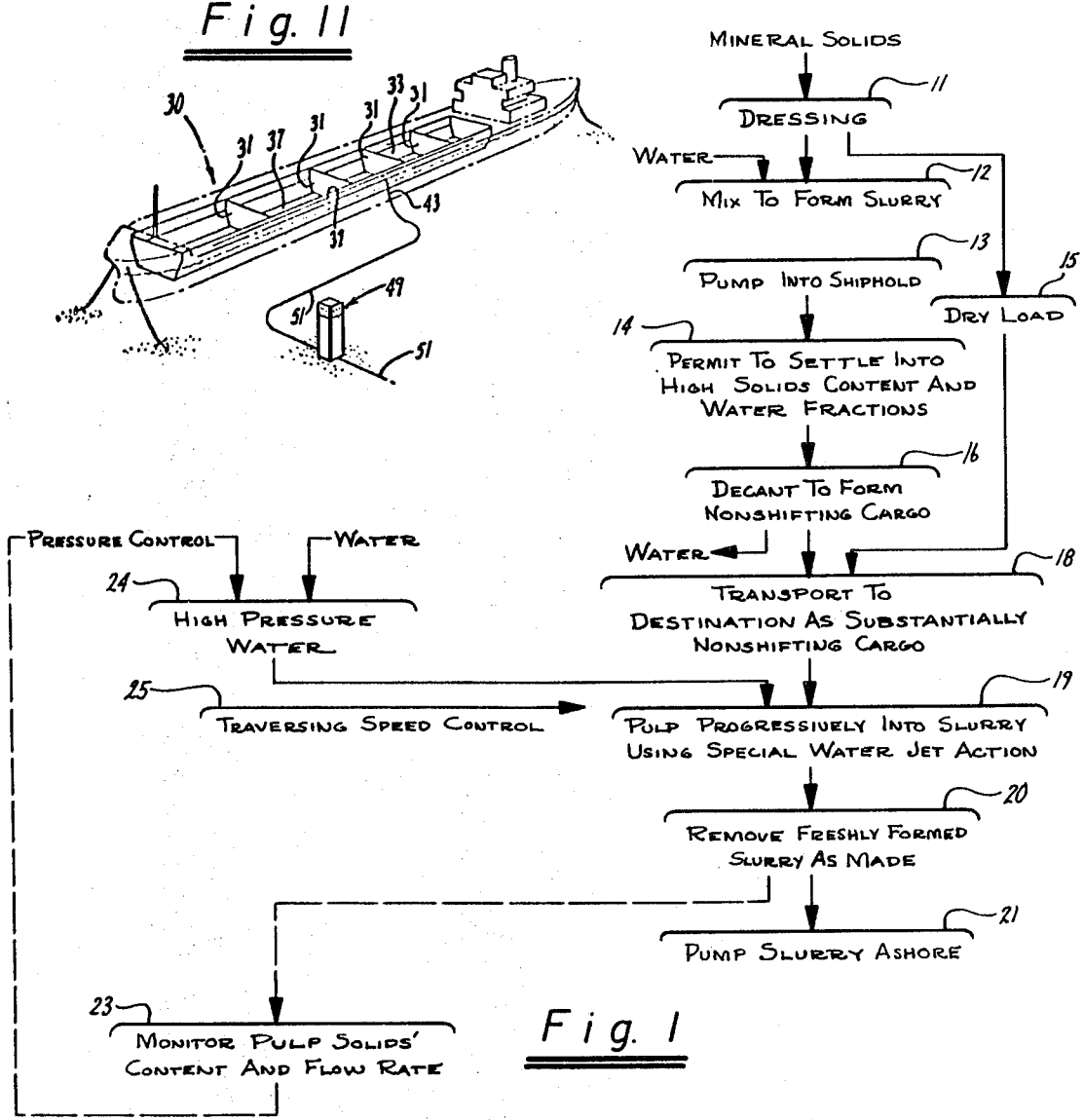
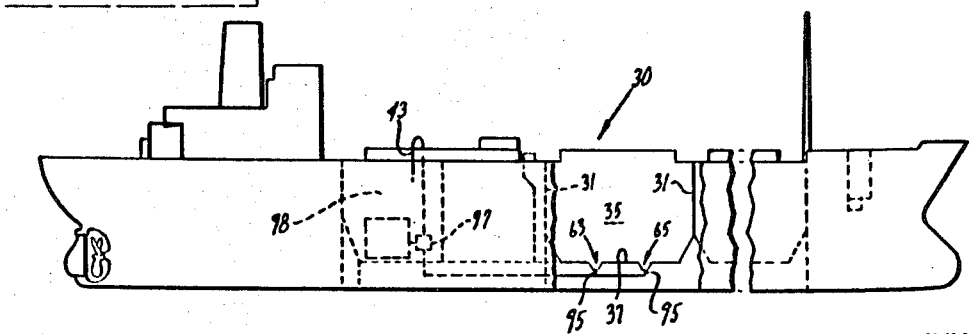
Fig. 2
INVENTORS
Charles W. Robinson
Glenn E. Craig
Emmett J. Murphy
BY
ATTORNEYS INVENTORS
Charles W. Robinson
Glenn E. Craig
BY   Emmett J. Murphy

ATTORNEYS

INVENTORS
Charles W. Robinson
Glenn E. Craig
BY Emmett J. Murphy

ATTORNEYS

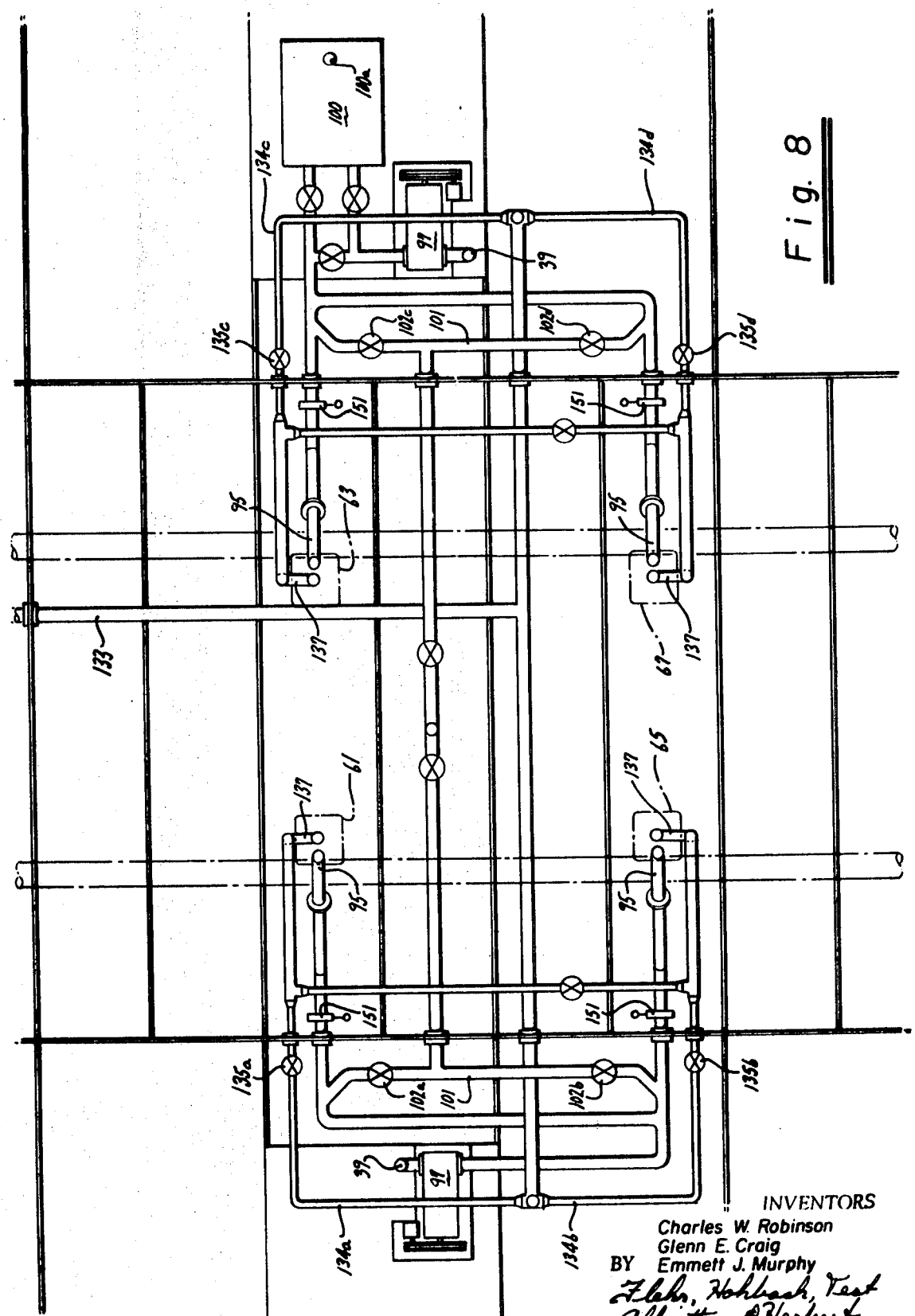

INVENTORS
Charles W. Robinson
Glenn E. Craig
Emmett J. Murphy
BY
ATTORNEYS

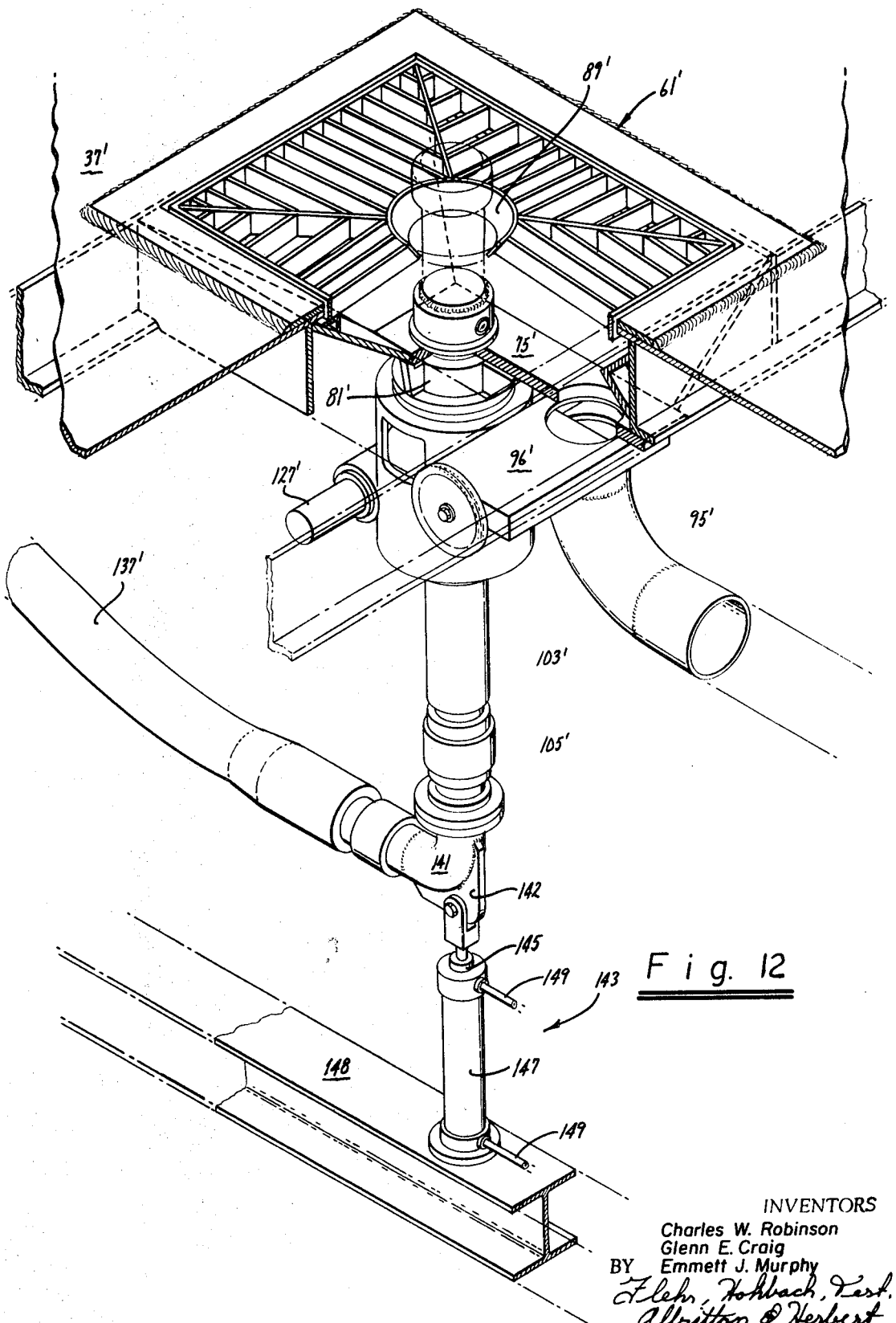

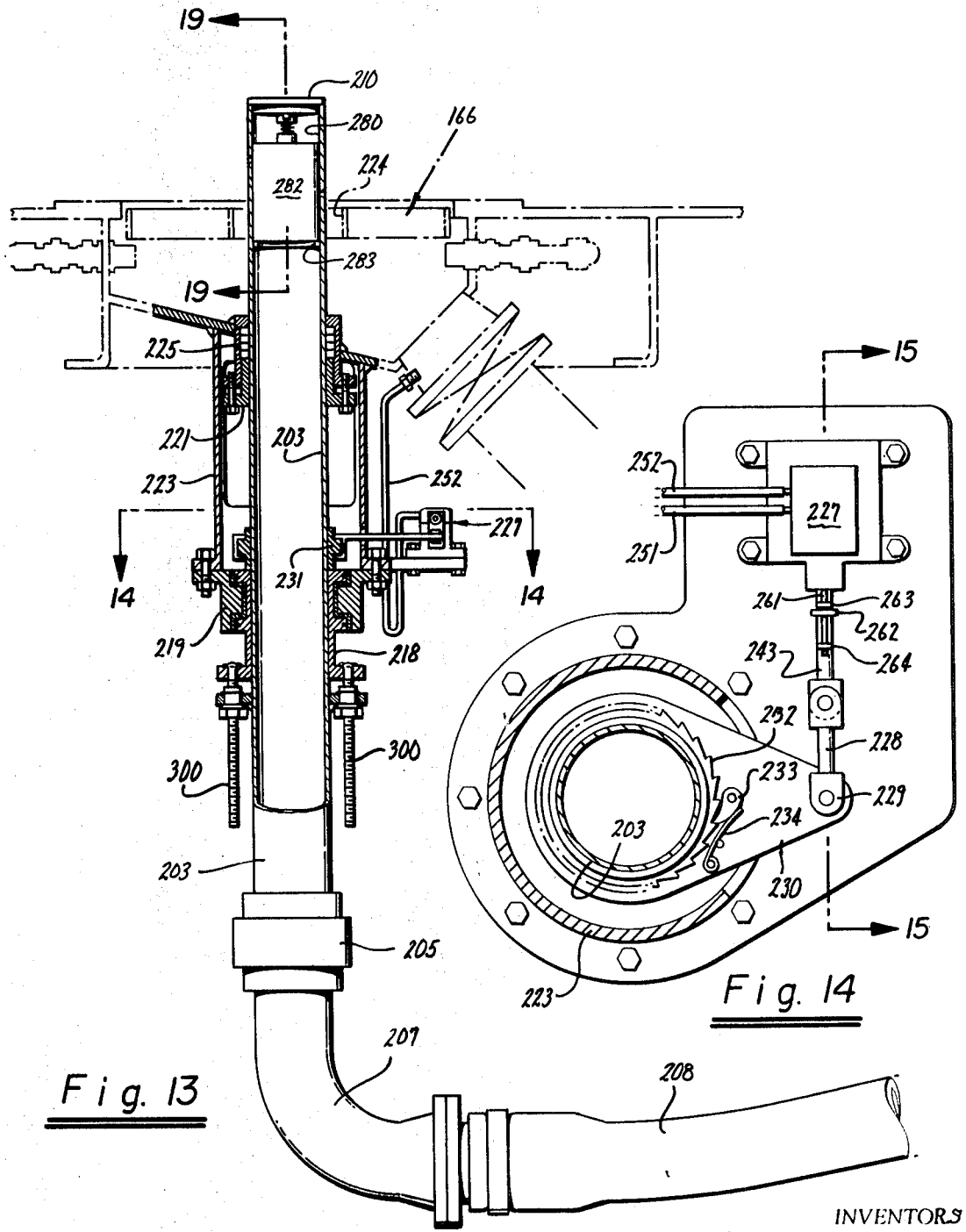

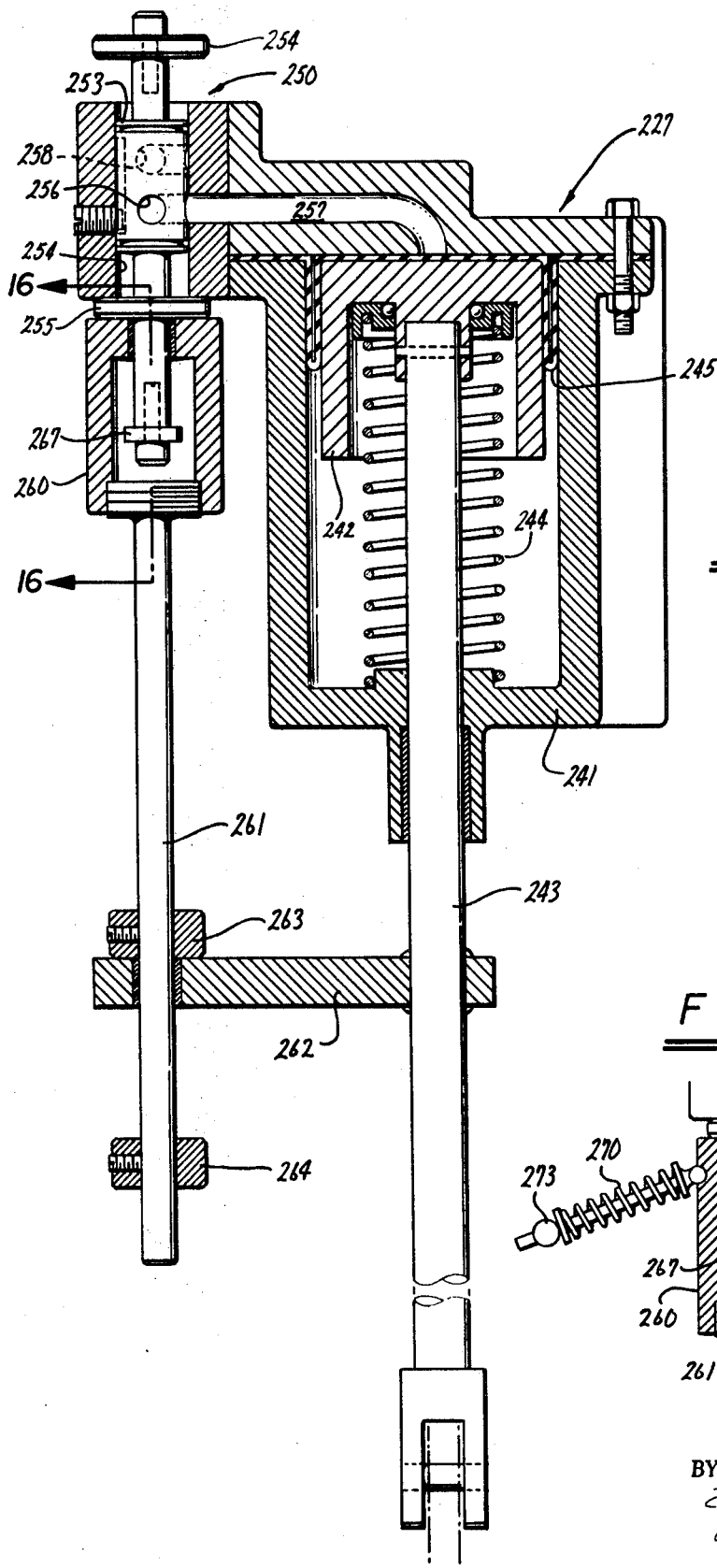

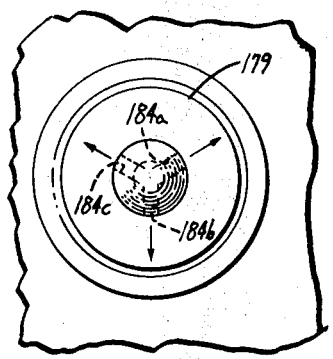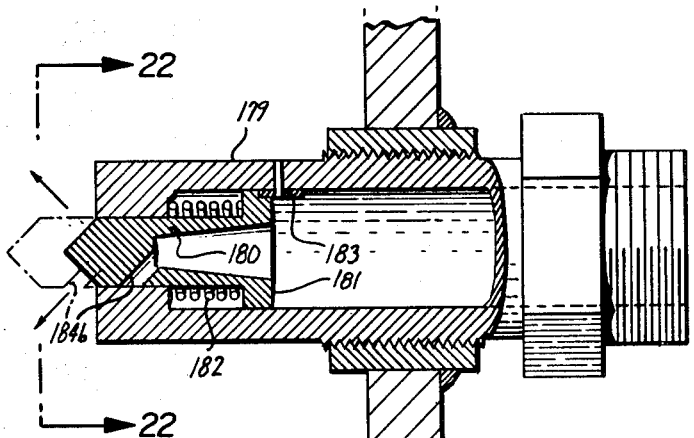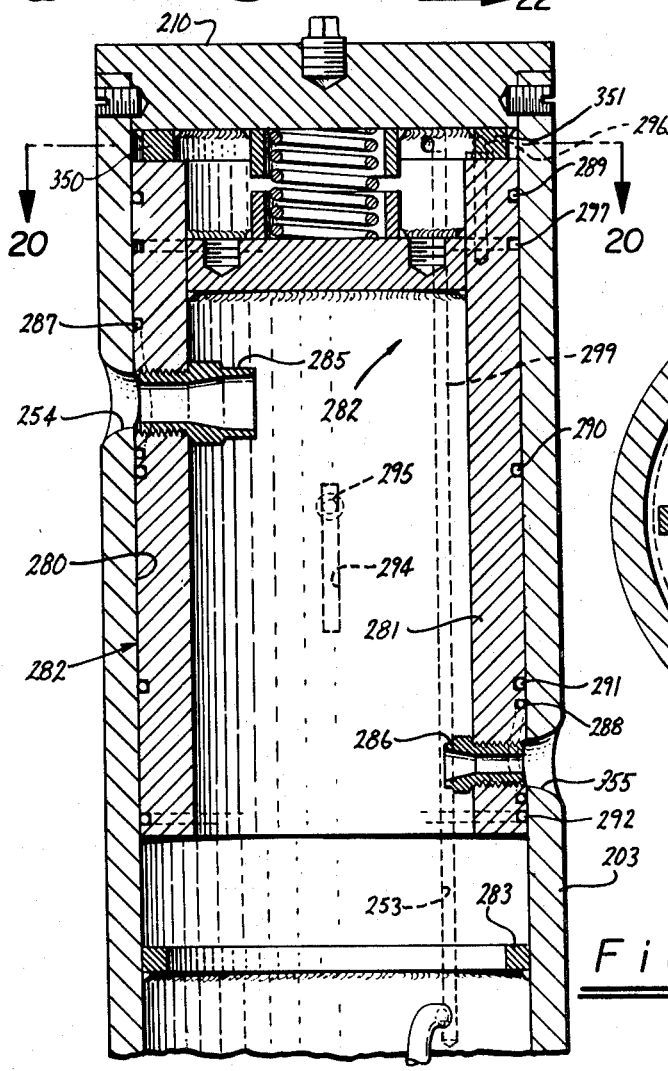

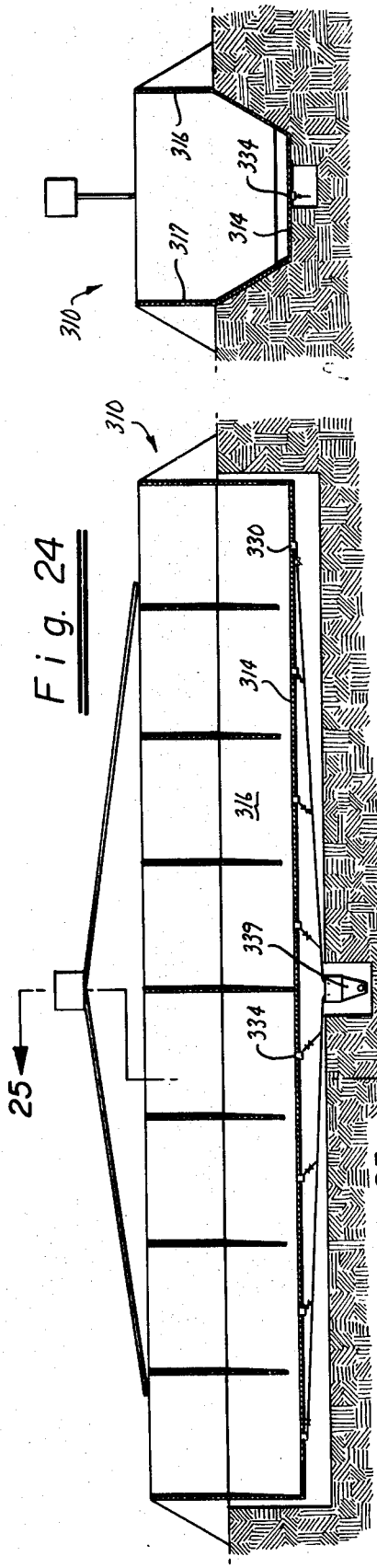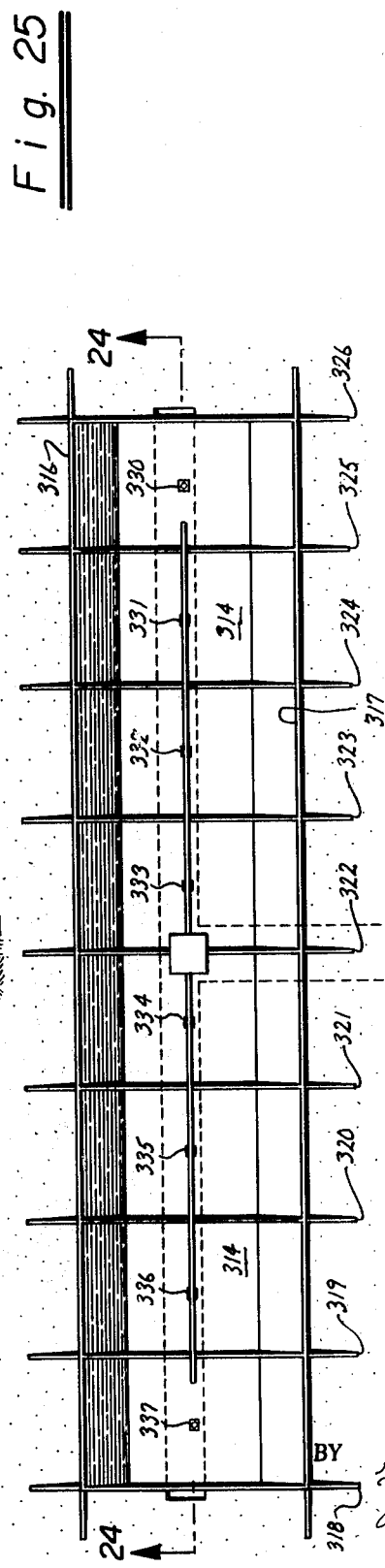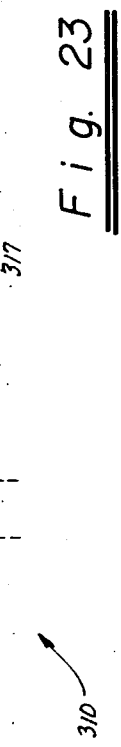

Sept. 20, 1971  C. W. ROBINSON ET AL  3,606,479
METHOD AND APPARATUS FOR THE STORAGE AND PULPING OF
MATERIAL ORES AND COMPARABLE PARTICULATE MATTER
Filed July 10, 1969  13 Sheets-Sheet 13

INVENTORS
Charles W. Robinson
Glenn E. Craig
BY Emmett J. Murphy

ATTORNEYS

United States Patent Office 3,606,479
Patented Sept. 20, 1971

3,606,479
METHOD AND APPARATUS FOR THE STORAGE AND PULPING OF MATERIAL ORES AND COMPARABLE PARTICULATE MATTER
Charles W. Robinson and Glenn E. Craig, San Francisco, and Emmett J. Murphy, Woodside, Calif., assignors to Marcona Corporation, San Francisco, Calif.
Continuation-in-part of application Ser. No. 827,300, May 23, 1969. This application July 10, 1969, Ser. No. 863,001
Int. Cl. B65g 53/30
U.S. Cl. 302—16
33 Claims

ABSTRACT OF THE DISCLOSURE

Method for the storage, handling and pulping of discrete or particulate minerals (e.g. iron ore solids) and comparable particulate matter. Assuming that the mineral solids are to be stored on a ship or like carrier, the ship is provided with cargo carrying holds having bottom and side walls forming storage vessels into which the mineral solids are introduced. In a shore based installation, a storage vessel is utilized which also has bottom and side walls. The bottom wall of each such storage vessel is equipped with one or more sumps from which slurry is removed. When it is desired to remove the discrete mineral solids from a vessel, water jets are discharged to form a pulping zone near the bottom of the vessel and directly overlying its bottom. These water jets are directed and traversed in such a manner that the solid minerals are acted upon and pulped progressively in the pulping zone, and the zone is moved as the water jets are traversed to thereby progressively cover all of the region overlying the entire bottom wall. Simultaneously, the freshly formed slurry is removed as rapidly as possible to prevent flooding. As the freshly formed slurry is removed, the remainder of the overlying solids progressively move downwardly to the pulping zone under the influence of gravity, and may slide or cave in in such a manner that the energy of the fall aids in breaking up the material.

---

This application is a continuation-in-part of our previously filed application Ser. No. 827,300, filed May 23, 1969, entitled "Slurry System for Ship Transportation of Mineral Ores and Other Particulate Matter."

The apparatus of the present invention produces the desired water jets streams and includes means disposed in the lower portion of each storage vessel which discharges water jets or streams laterally over the bottom to form a pulping zone. These means are progressively traversed so that the pulping zone moves throughout the entire region directly overlying the bottom. The progression of the water jets above the bottom of the vessel is accomplished by providing rotating heads immediately above each sump which heads either continuously rotate at a slow speed or are moved in a step by step fashion.

The method and apparatus of the present invention are particularly adapted for use in ship installations but also find considerable utility in many shore installations. The shore installations may, for example, be at the shipping point where discrete minerals are being stored pending pulping and pumping to a ship; or they may be at the destination where the shore installation is to receive ore solids from a ship, with subsequent pulping of the solids and pumping of the same in slurry form to further processing equipment.

BACKGROUND OF THE INVENTION

In many instances it is desirable to move minerals or ore solids to and from vessels in which such solids may be stored. In some instances the storage vessel will be the hold of the ship or other carrier and in other instances it may be a storage vessel forming part of a shore installation slurry system. It has been found possible to pump a slurry of mineral solids into such a storage vessel after which the solids are permitted to settle by gravity leaving an overlying fraction of water. The water fraction is then removed by decantation to leave a settled mass of mineral solids. If the storage vessel is the hold of a ship, normal movement of the ship and vibration of its machinery causes a progressive increase in the compaction of the settled solids so that, at destination, the compacted mass of settled solid is difficult to remove. It does not flow and strongly resists being repulped since it becomes a very cohesive solid with considerable constructural strength and high resistance to flow. It has no angle of repose and can even arch over a large void. Similar difficulties arise in shore-based installations and make it difficult to reliably repulped settled slurry from storage tanks or surge tanks.

SUMMARY OF THE INVENTION AND OBJECTS

This invention relates to a method and apparatus for the storage and handling of discrete minerals or comparable particulate matter in slurry form. More particularly the invention relates to a method and apparatus in which the material is pulped with water to form a pumpable slurry for removal from a storage vessel.

In general, it is an object of the present invention to provide a method and apparatus for the storage and pulping into slurry of discrete minerals and comparable particulate matter. The method and application described herein make it possible to pulp relatively compact masses of discrete mineral solids with water whereby such pulped solids can be pumped as a slurry.

Another object of the invention is to provide an apparatus and method of the above character which has particular application to ship installations but which likewise is applicable to shore installations.

Another object of the invention is to provide a method and apparatus of the above character which is applicable to systems for handling, storage and shipment of mineral solids, having reference particularly to systems in which mineral solids are pumped as a slurry from a shore installation to the hold of a ship and there permitted to settle to form a relatively compact solid mass, after which the upper water fraction is removed by decantation. At the destination the compacted solid mass of mineral solids is pulped wtih water in accordance with the disclosed method and apparatus and then pumped as a slurry to a shore installation.

Another object of the invention is to provide a method and apparatus of the above character in which the settled, compacted mass of material is reslurrified and discharged at destination by a technique in which the freshly reslurrified material is immediately discharged from the vessel in which it is contained.

Another object of the invention is to provide a method and apparatus of the above character in which the liquid-solids content of the resultant slurry is adjusted to an optimum level for slurry handling.

Another object of the invention is to provide a method and apparatus of the above character which is particularly adapted for use on ships either by converting existing vessels or by converting or manufacturing a multi-use ship, such as slurry ore carrier-tanker-bulk cargo carrier. By using the present invention in which the dressed ores are handled in slurrified form, it is possible to bring sufficient economies to the ocean transportation of such ores that such marginal locations can become economically feasible to operate. Additionally, the above can be accomplished without requiring additional investment for harbor construction since a slurry handling system permits remote positioning of the vessel at an offshore facility similar to that now used by large supertankers.

A further object of the invention, therefore, is to provide a slurry system for shipment of ores which does not require the use of traditional land-based harbor installations.

Another object of the invention is to provide a method and apparatus of the above character which is inherently capable of economic operation and which is capable of being expanded at a reasonable capital investment.

As disclosed herein, the invention concerns method and apparatus involving the slurrification, dewatering, resuspending and dispersion of solid particulate matter in a liquid, usually water. The solids can be of any solid particulate matter of a character comparable to particulate mineral ores and the liquid can be fresh water, sea water, brine or even nonaqueous liquids. For purposes of setting forth an example of the invention herein however, the disclosure is directed to the slurrification and handling of iron ore filtrate (magnetite) or concentrates in a water-solids system. Such iron ore filtrate or concentrates can take various forms, including the typical products of ore dressing, such as highly concentrated filter cake. As used herein, mineral solids is meant to include ores, dressed ores and all other comparable particulate matter and ore products capable of being pulped into a pumpable slurry.

As applied to a ship installation, the method of the present invention calls for the mineral solids to be suitably dressed for slurrification as by being subdivided by known procedures whereby the solids are small enough to be capable of dispersion in a suitable liquid, such as water, so that a slurry suspension is obtained. Sufficient water is mixed or agitated with the mineral solids to form a slurry of pumpable consistency which is then pumped through piping into the watertight holds of the ship. There the slurry is allowed to settle into an upper fraction or layer predominantly consisting of clear water covering layers or fractions of settled material having the higher solids concentration than the slurry. After settling, the water is decanted, leaving each hold containing a substantially nonshifting cargo of mineral solids in which form it is transported to destination. In some instances, it will be possible to dry load the ship. In that case, the mineral solids will still have to be suitably dressed for slurrification but the addition of water to form a slurry and the decanting of excess water will not be necessary. During the voyage to destination, the contents of the holds become compacted through a combined action of the motion of the ship in a seaway and the vibration of its engines as applied to a mass having considerable hydrostatic pressure. The action causes the voids or water in the mass to become expressed and the solids to attain a density of about 90% solids or greater; in which form, a very hard solid mass is formed.

The ship is provided with suitable apparatus for reconstituting a slurry from portions of the mass and for pumping the freshly formed slurry immediately off through suitable piping system. This apparatus includes a plurality of sumps positioned beneath the inner bottom of each hold and covered with an open grating or lattice which prevents unslurrified collapsing material or clumps of material from entering the sumps and clogging the discharge lines. The lower wall of each sump is provided with a slurry discharge piping which is ultimately connected to an offloading discharge pump, which can be of the centrifugal type, either by direct connection or through a surge tank which evens the discharge to obtain constant volume out for the pump and can be used to supply make-up water. A cylindrical head is mounted for rotation about a generally vertical axis and carries a nozzle for developing a high velocity water jet or stream in a pulping zone immediately overlying the bottom wall and the level of the grate. The head is formed so that the nozzle is concealed and is provided with a cylindrical exterior so that rotation thereof does not cause interengagement with surrounding material.

A suitable motor rotates the head to cause the high velocity liquid stream emitted by the nozzle to slowly move and to traverse into contact with adjacent solids where it disperses the solids through the cutting action of the impact of the stream to thereby break up, disintegrate, and resuspend those solids into slurrified or nearly slurrified form. Simultaneously, the water stream moves away from freshly impacted material and reformed slurry to an adjacent position and the freshly formed slurry is simultaneously withdrawn by flowing backwards to the sump under gravity as rapidly as it can flow away from its point of reformation. In this way, no standing water or slurry is developed in the pulping zone and a substantially unimpeded path is maintained between the solids being impacted and the nozzle. This avoids the problem of energy loss associated with flooding, where the water stream impacts slurry or standing water rather than actually reaching new material. The nozzle continues to rotate and to supply a water jet which works gradually outwardly in reforming slurry until it has undercut a sufficient amount of the compacted ore mass so that the latter collapses and is successively removed as a slurry to empty the hold. In shore based installations the same arrangement is used. Such shore based installation include temporary storage facilities at the shipping point, which are used for rapid loading of ships at destination, such installations provide the requisite capacity to receive slurry for off loading vessels and to resupply the same to processing mill or slurry pipelines. Additionally, the apparatus of the present invention is also useful for incorporation in surge tanks such as are used in slurry pipelines. In such applications, any material which settles out, as from a stoppage, is readily repulped so that the system quickly returns to operation.

These and other features and objects of the invention will become apparent from the following description and claims in which the preferred embodiments are set forth in detail when taken in conjunction with the accompanying drawings.

BRIEF DESCRIPTION OF THE DRAWINGS

FIG. 1 is a flow sheet depicting the procedure for carrying out the present invention.

FIG. 2 is a longitudinal, elevational view, partially broken away, of a typical ship constructed in accordance with the present invention.

FIG. 8 is a piping diagram in plan for the hold shown in FIGS. 2 through 7.

FIG. 11 is a perspective view of the ship constructed according to the present invention mored off shore and connected to a suitable pumping station for off-loading.

FIG. 12 is an isometric view of a modified form of a sump discharging apparatus constructed in accordance with the present invention.

FIG. 13 is a cross-sectional view in elevation of another embodiment of pulping apparatus constructed in accordance with the present invention.

FIG. 14 is a top plan view taken along the lines 14—14 of FIG. 13.

FIG. 15 is a cross-sectional view taken along the lines 15—15 of FIG. 14.

FIG. 16 is a cross-sectional view taken along the lines 16—16 of FIG. 15.

FIG. 19 is a detailed cross-sectional view of the head construction of the pulping apparatus of FIG. 13 taken along the lines 19—19 thereof.

FIG. 20 is a cross-sectional view taken along the lines 20—20 of FIG. 10.

FIG. 21 is a detailed cross-sectional view of a flushing nozzle constructed in accordance with the present invention and taken along the lines 21—21 of FIG. 17.

FIG. 22 is an end view of a flushing nozzle taken along the lines 22—22 of FIG. 21.

FIG. 23 is a top plan view of a shore based facility constructed in accordance with the present invention.

FIG. 24 is a cross-sectional view taken along the lines 24—24 of FIG. 23.

FIG. 25 is a cross-sectional view taken along the lines 25—25 of FIG. 24.

DETAILED DESCRIPTION OF THE PREFERRED EMBODIMENTS

Figure 3:
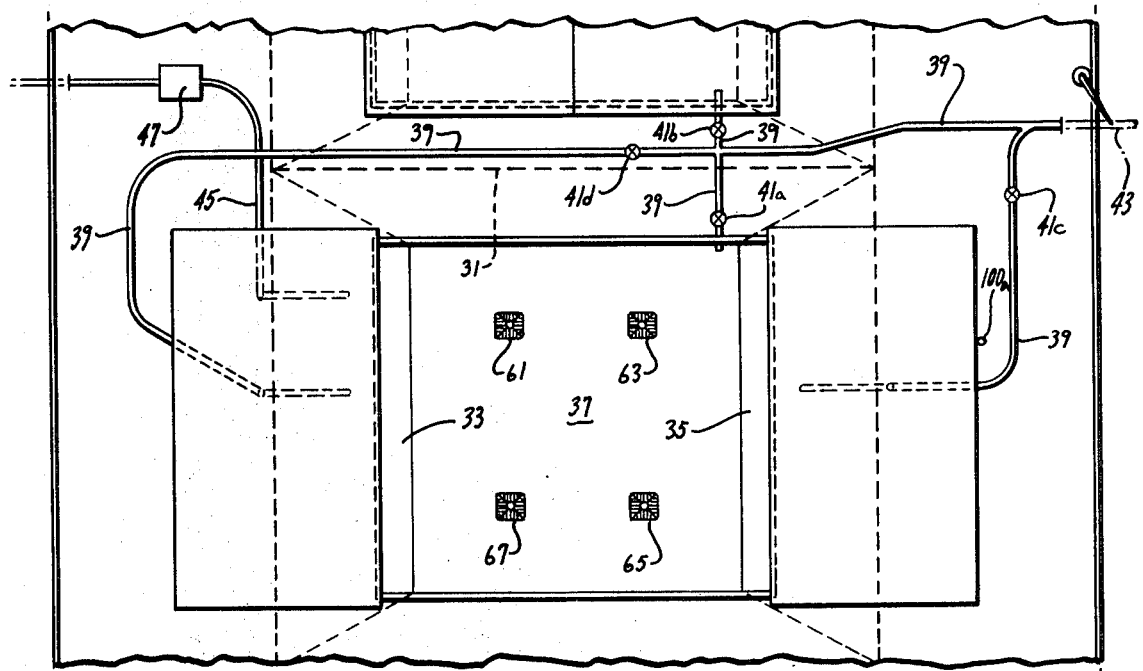
FIG. 3 is a top plan view of one hold of the ship of the present invention and showing the same with hatch covers drawn away to reveal the interior.

Referring to FIG. 1, there is shown a flow sheet illustrating the general procedure used in the present invention as applied to the slurry transportation of mineral solids, such as iron ore filtrates, by ship. In step 11, the mineral solids are dressed by procedures in which they are subdivided or formed into a size suitable for forming a slurry. By way of example, for magnetic concentrate, a particle size of about 75% less than 325 mesh is satisfactory. However, it will be understood that many other ranges of size are slurrifiable and that the invention is applicable to such ranges of size. A suitable quantity of water is added in step 12 and mixed together with the mineral solids to form pumpable slurry having a high solids content, the amount of water being limited so that a minimum amount of excess water will have to be later removed. A solids content for a water-magnetite system of about 75% or slightly less has been found satisfactory for the purpose, although a solids content of up to 80% could be used. Above 80% the flow properties from the resultant mixture become undesirable until, at about 90% solids, a water-magnetite mixture begins to behave as a solid.

Step 13 the slurry is pumped through suitable piping into the hold of a ship. Such piping can be of flexible or semi-flexible pipe which can be laid over terrain or can be submerged to an offshore pumping station or facility for facilitating the loading of the ship. In the hold the slurry settles (step 14) yielding a fraction or layer of excess water overlying a settled more concentrate of sediment or fraction of solid material solids. The water layer is decanted in step 15, as by drawing or pumping it off of the top of the settled solids fraction. For certain installations already adapted to dry-load (step 16), the dressed mineral solids are directly dumped into the hold. In some situations, it will be desirable for the steps of loading, settling and decanting to be cycled between different holds or sequentially in the same hold so that the decanted water can be removed while maintaining control over the ship's trim and cargo distribution. Additionally, such cycling and sequential loading will permit the ship to be loaded without exerting an undue shear strain upon her hull and structure.

After loading and decanting, or dry-loading, the settled solids take the form of a substantially non-shifting cargo which is then transported (in step 18) to destination. In the course of the voyage, the ship's vibrations due to her engines and motion in the seaway acting upon the material together with the gravity created hydrostatic head, tend to settle the material into a dense, caked mass which is extremely solid and difficult to reconstitute into slurry.

At destination, this settled, compacted solids are repulped (in step 19) into a slurry of pumpable consistency by utilizing a technique in which high pressure water streams or jets are impacted upon the lowermost portions of the mass by creating a high force water stream or jet at the bottom of the load and immediately above the inner bottom. Each water jet stream impacts upon a portion of compacted solids and causes it to disperse and break up, and to become suspended in the water as a slurry. The stream is slowly moved or traversed along adjacent portions of compacted material as by causing it to rotate as the stream moves away from the region of impact to an adjacent region. The freshly formed slurry left behind is simultaneously removed (in step 20) as it flows back to the sump or to a nearby sump to thereby avoid the formation of any standing water or standing slurry. In this way, the cutting action of the traversing water stream is undiminished in impacting the compacted solids, since it retains a free and unimpeded path. The preceding steps are continued to thereby undercut and remove reslurrified material over an area which continues to increase until the material above collapses, is successively removed, and the hold is emptied.

The present invention is characterized by an ability to undercut gradually increasing arcs of material within the potential sphere of action of the high energy water stream. The effective influence of the water stream is found to extend to about 15–20 feet for 300 p.s.i. water. It is further found that by locating the streams on centers approximately 30 feet apart and 10–15 feet from vertical bulkheads, an entire lowermost layer of compacted solids can be cut away, reslurrified and withdrawn if necessary so that the material above must drop and cannot arch over or stand. If higher water pressures are used, the distances over which the stream is effective can be increased. Preferably, the bulkheads are substantially vertical so that after undercutting there is ultimately insufficient support for compacted mass and it must fall and collapse to thereby be successively removed and pumped ashore (in step 21) until the hold is emptied.

It is further found that by varying the speed of rotation and the pressure applied, the percentage of solids of the slurry can be controlled over a considerable range. Therefore, the density of the slurry is monitored (in step 23) and used to control the amount of pressure applied in step 24. This and other information is used in step 25 to control the speed of traverse of the stream. Generally, the solids density will increase when the pressure is increased.

While the above procedures were particularly developed for use in ship transportation, they are found immediately applicable to many shore based situations. For example, the present invention is especially useful in bulk storage facilities for temporary storage of slurry material as in feed systems for mills. Surge tanks incorporated in slurry piping systems are often prone to shut down due to an inability to resuspend settled slurrage which may result from temporary stoppage of flow in the lines. In these applications the same general procedure is used as above except for the obvious elimination of step 18 regarding transportation of the cargo.

Figure 9:
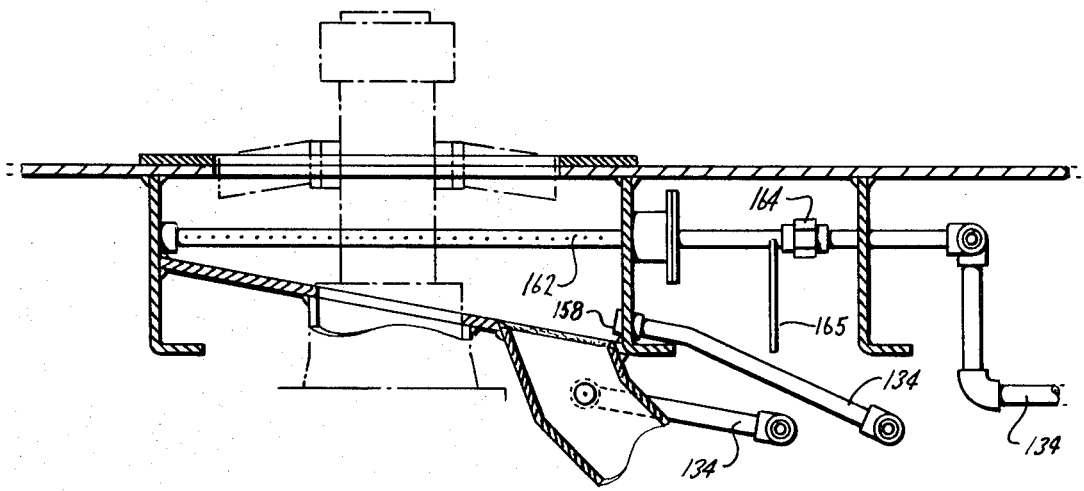
FIG. 9 is a more detailed view in elevation of flushing system used for the sump of FIG. 5.

Referring now to FIGS. 2 through 9, there is shown suitable transportation apparatus for carrying out the invention and includes a ship 30 having a plurality of watertight holds formed by transverse bulkheads 31, longitudinal bulkheads 33, 35 and an inner bottom 37. Slurry distribution piping 39 may be provided and includes suitable valves 41a–41d for selectively routing the slurry received from or delivered to an inlet/discharge pipe 43 to various of the holds. A water discharge line 45 and pump 47 are provided for removing water from settled slurry. The ship could be anchored at a suitable offshore pumping station 49 (as shown in FIG. 9) served by submerged pipe line 51 connected to inlet discharge pipe 43 so that conventional port loading facilities are not required. It is to be understood, however, that the ship can be serviced at conventional port facilities or in any other convenient manner and that many advantages of the invention would still inure due to the speed and high capacity of the slurry discharge system disclosed herein.

It has been found that a relatively flat bottom hold is more amenable to satisfactory repulping practice than inclined surfaces. It is preferred therefore that the bottom 37 be relatively flat or have only a slight inclination towards a discharge sump but no more than is necessary to enhance flow of the slurry pulp formed to a sump. In the same connection, the longitudinal and transverse bulkheads of the ship are preferably nearly vertical since the compacted mass within the hold has no angle of repose and will stand up at 90° or form an arch over a void below. Under the circumstances, any inclination, especially below about 75°, will serve as additional support for the material and hinder satisfactory operation. The drawings of the present application were developed from an actual experimental conversion of the ship Oread (formerly the A. D. Christenson) and the cost of changing the longitudinal bulkhead configuration to a more vertical inclination was considered prohibitive. However, in original construction, the longitudinal bulkheads are preferably inclined vertical or as nearly vertical as may be required to satisfy good tanker practice as well as to operate as a slurry ore carrier.

Each hold is provided with at least one sump 61 and preferably with a plurality of sumps 63, 65, 67, each of which is similar and formed with side walls 69 and end walls 71 peripherally connected about an opening 73 in the inner bottom and converging downwardly below it to a bottom wall 75 having a centrally disposed opening 77 to which is welded a section of circular pipe 79 carrying an integral flange 81 at its lower end.

The opening in the inner bottom is covered by a suitable grate 83 which is provided with bars 85 for resting against the surfaces of the side walls 69. This grate has openings sufficiently large to permit slurried material to pass through and into the sump for discharge but prevents any large clumps from entering and clogging the sump. The grate can be of any suitable construction. One form found suitable for a generally rectangular opening utilizes diagonal struts 87, 88 welded to a generally cylindrical section 89 opening centrally over the opening 77 in the bottom of the sump. A plurality of equally spaced bars 91 are attached between the center section 89 or from a diagonal, such that they form slots 93, preferably about 2 inches wide and opening away from the sump so that reformed slurry flowing along the inner bottom towards the sump can easily pass unimpeded into it but clumps larger than the spacing of the grate elements are captured and held up above the grate where they are disintegrated on the next pass of water stream.

Each sump is provided with a slurry discharge outlet 95 which connects through the bottom wall and passes downwardly through a gate valve 96 to a slurry pump 97 which is located in the wing tanks but normally could be located in one of the ship's pump rooms 98, such as that located just forward of the machinery space (FIG. 2).

The output of the slurry pump is connected to discharge piping 43. As shown, the input of the pump is connected directly to the discharge outlet 95 of the associated sumps.

In general, it may be difficult to obtain a uniform flow rate from the sump while keeping the sump as clear of slurry as possible. Furthermore, surges in the flow from the sump cause difficulties in the operation of the pump which has a fixed flow rate, and, in the course of re-slurrification, the resulting percentage of solids is not uniform. Accordingly, it is desirable to make some provision to obtain a holding time and volume in the discharge line so as to stabilize the flow and percentage of solids.

For these purposes, a surge tank 100 can be incorporated into the bilges or lower wing tanks and is provided with an inlet to receive slurry flowing under gravity. Surge tank 100 is closed except for a surge structure 100a which rises and vents to upper-deck level and an outlet connected to the slurry discharge pump. Additionally, a line can be connected to the ship's water system to provide make-up water to help establish a substantially uniform flow velocity in the discharge lines and avoid settling of slurry and resultant plugging of the lines. The make-up water inlet can be controlled by a suitable level sensing device incorporated in the surge tank.

As shown in FIG. 8, a parallel connection from the slurry discharge piping can be provided to ship's low pressure water supply and consists of piping 101 together with suitable valves 102a–102f for flushing the slurry system.

Figure 6:
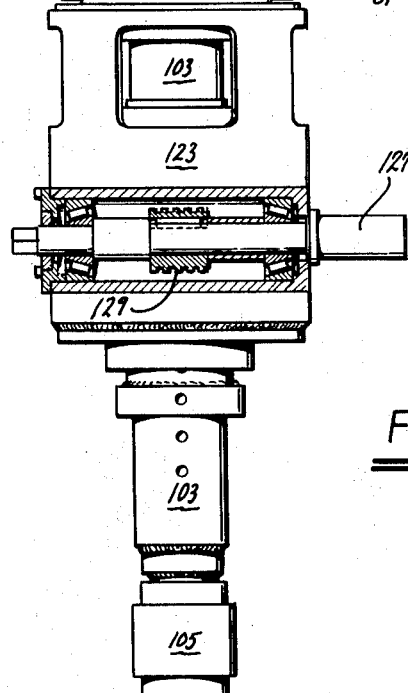
FIG. 6 is a cross-sectional view taken along the lines of 6—6 of FIG. 5.
Figure 7:
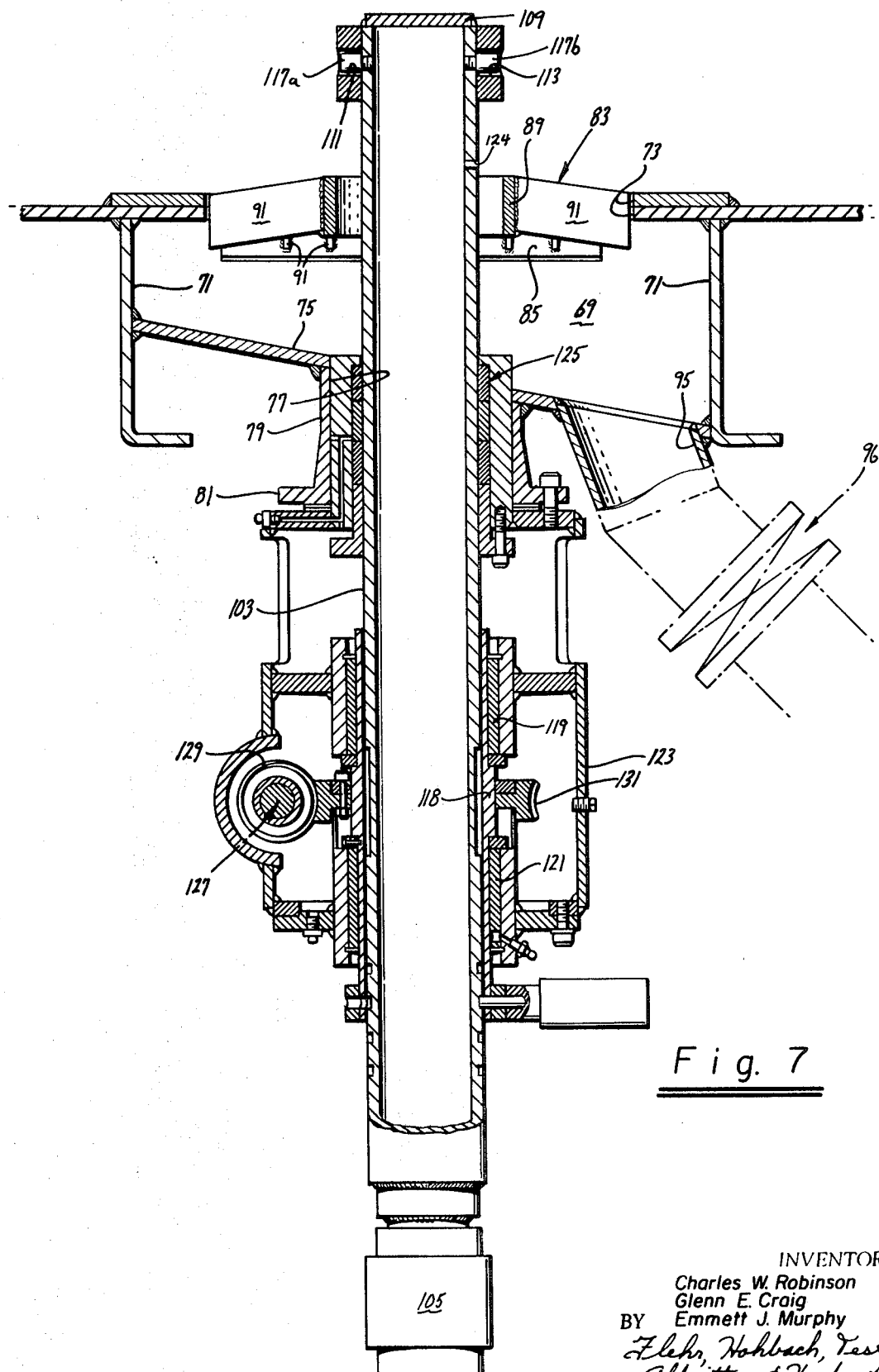
FIG. 7 is a cros-sectional view along the lines 7—7 of FIG. 5.

Referring now particularly to FIGS. 6 and 7, there is shown in detail means for forming a traversing water stream or jet of high energy and disposed immediately above the grating. Such means includes a hollow shaft 103, the lower end of which terminates and rotates in a partially fixed rotary union 105 for effecting seal with high pressure water coupling 107 and permitting the shaft 103 to turn. Coupling 107 is connected to high pressure supply 108 of water which develops a head of about 250–350 pounds per square inch.

The upper end of shaft 103 is closed by a cap 109 having a cylindrical shape so that rotation of the shaft and cap is free and presents no projections which could interfere or become stuck in surrounding solids. The cap has a thickness sufficient to house and conceal, within openings 111, 113 through its wall, one or more nozzlts 117a, b which are screwed into engagement with the wall of shaft 103. The shaft 103 is keyed to a sleeve 118 set on spaced bearings 119–121 vertically aligned and set in a housing 123 secured to flange 81 so that the shaft extends upwardly through the sump and through the cylindrical section 89 of the grating and can be adjusted relative to the sleeve. The height of the shaft and the associated nozzles is arranged to a level somewhat above the grate and may be preferably positioned at a height up to about 6 inches above the grate. In addition, another nozzle 124 may be provided in the wall of the shaft at a height slightly above the grate for cleaning up any clumps or other material that accumulates. A suitable seal 125 is provided between the upper bearing and the sump to seal out the abrasive material and silt. Shaft 103 is rotated by means of a positive displacement hydraulic motor 127, the output of which is connected to the sleeve and shaft through suitable gearing including a worm gear 129 connected to the output of the motor and a wheel gear 131 circumferentially mounted about the sleeve. Hydraulic motor 127 can be connected to a suitable source of pressurized liquid such as an oil supply, but preferably is operated through a by-pass and valve connected to the high pressure water supply 108. The level or positioning of the shaft may be adjusted upwardly or downwardly to provide an optimum positioning for the nozzles.

Figure 4:
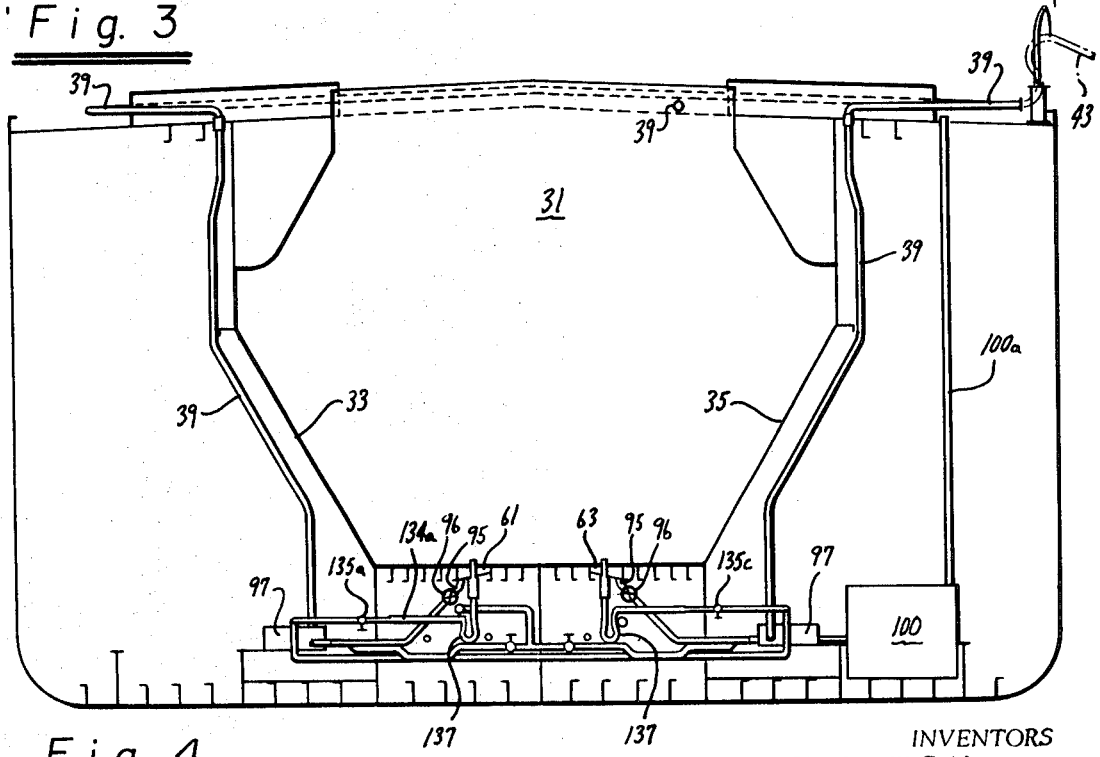
FIG. 4 is a transverse cross-sectional view of a ship's hold taken along the lines 4—4 of FIG. 3.
Figure 5:
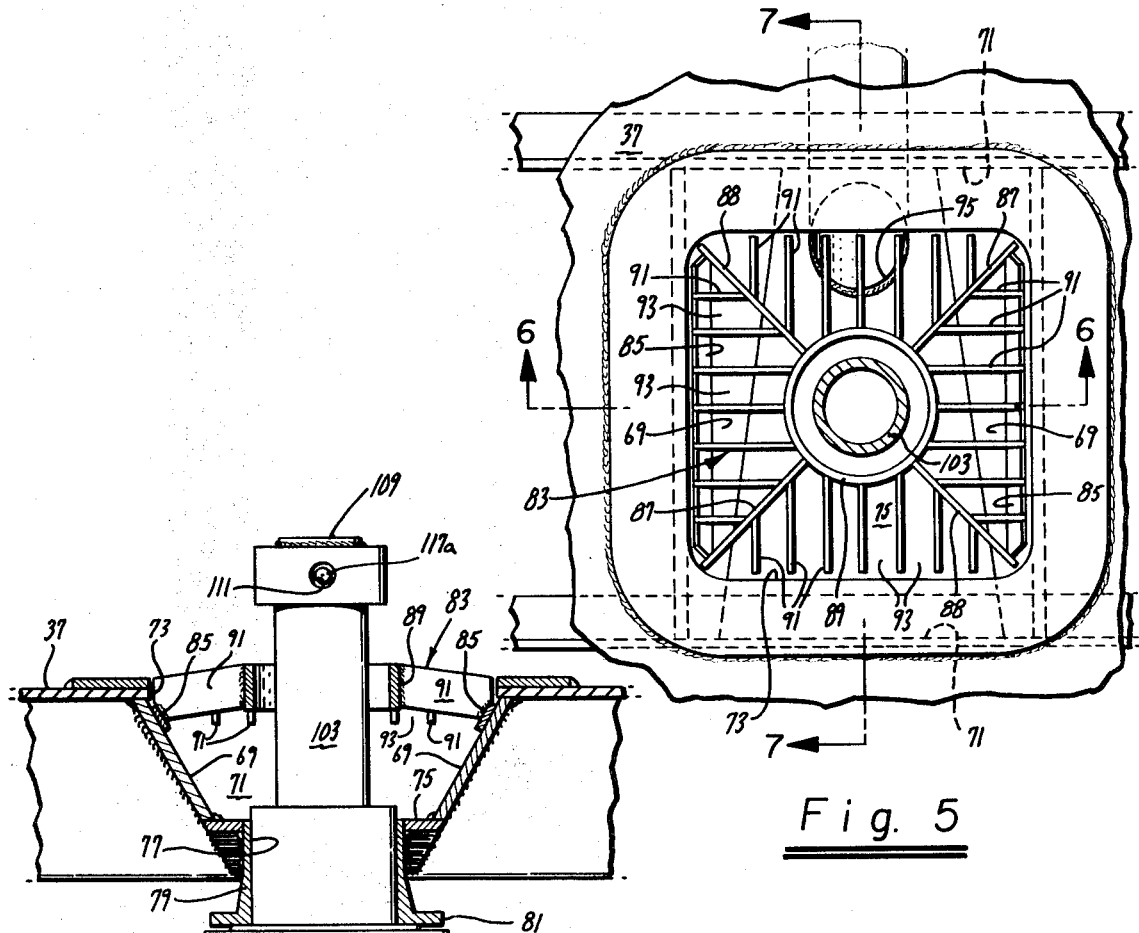
FIG. 5 is a detailed top plan view of a discharging apparatus constructed in accordance with the present invention.

Referring again to FIG. 8, the high pressure inlet piping 133 and distribution piping 134a–134d supply the several sumps through suitable valves 135a–135d for selectively controlling the distribution of high pressure water to each of the sumps. As shown in FIG. 4, each high pressure water piping terminates in a flexible hose 137 which connects to the rotary union 105 so that the elevation of the nozzle carrying head can be conveniently adjusted.

In the operation of the foregoing apparatus, certain variations in the procedures are useful to obtain optimum performance and various arrangements may be used and varied. Thus, nozzles are usually mounted at 180° orientation with respect to each other and preferably are positioned within a range of about 1½ inches to 6 inches above the inner bottom or tank top. The nozzles are aimed approximately parallel to the surface of the inner bottom so that a flat surface inner bottom calls for a nozzle mounted at right angles to the shaft and traversing a plane. If the inner bottom is inclined somewhat, the nozzle should be canted upwardly slightly at an angle to thereby describe a shallow cone but at any particular moment the stream from the nozzle will be travelling roughly parallel to the inner bottom. Additional nozzles can be provided for clean up and to facilitate movement of the reformed slurry but are not absolutely essential. Such additional nozzles may be aimed in various directions.

The nozzles 117 are of a type which deliver a solid stream of water over a considerable distance and are rated at 300 p.s.i.g. water. The traversing speed of the nozzles should be kept below about 6 r.p.m. and it will generally be found satisfactory to operate as low as ¼ r.p.m. and up to about 6 r.p.m. At these traverse speeds, a total delivery rate through a given head of from about 190 to 210 gallons per minute of water was satisfactory in one application. In this range of operation and particularly at about 1 r.p.m., an effective range runs to about 10 to 15 feet and the water stream diameter at the nozzle is approximately ½ inch away from which some spreading occurs. At this volume of injected water, it is found that a ratio of approximately one volume of added water from the nozzles will slurrify approximately one volumt of settled material to bring its solids concentration from 90% solids to 70% solids by weight. For a wide range of from 150–300 gallons per minute, a slurry containing about 55% to 75% solids is formed and is satisfactory in many applications.

While it may be possible to operate each sump and nozzle arrangement individually, it is preferred that all sumps in each hold be operated simultaneously so that the cutting and repulping action of each occurs in such a manner that the entire area underneath the settled slurry is undercut and removed at the same time.

Figure 10:
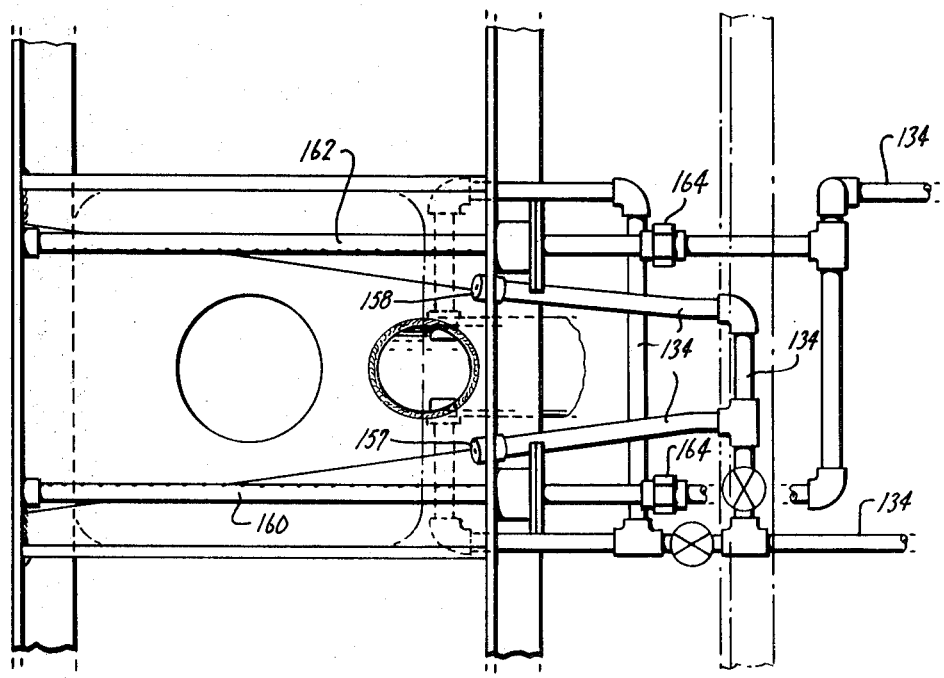
FIG. 10 is a plan view of the flushing system of FIG. 9.

As an aid to starting up operation of each sump additional low volume high pressure flushing nozzles are provided at convenient places within the sump. Referring to FIGS. 9 and 10, such flushing nozzles include fixed nozzles 155, 156 positioned at the entrance to discharge duct 95 and nozzles 157, 158 directed across the sump as shown. In addition to the above fixed nozzles, distribution manifolds 160, 162 are provided on each side of the sump and have a plurality of holes therein for creating smaller jet streams of water which are directed transversely from each manifold. The manifolds are connected through unions 164 permitting rotation to high pressure piping 134. Rotation is accomplished by means of a crank arm 165 which may be hand operated. These flushing nozzles provide sufficiently great volume of water and a suitable distribution thereof for establishing the proper volumt of operation during starting and final clean up of the sumps. An inspection plate can also be provided for permitting sluicing or scraping out of any material which is externally plugging any of the nozzles. In order to preserve clarity the inspection plate has not been shown in the drawing and the flushing nozzles have been omitted from some views.

Sensors 151 may be provided for continuously measuring the solids contents of the discharge slurry and are located across the discharge line, or at any other suitable position in the discharge system. Such sensors can be of any suitable type such as a gamma ray gauge together with the suitable readout which may have an output capable of regulating the pressure control for the high pressure system and nozzle. A feedback loop can be used to vary water pressure to maintain a satisfactory ratio of from about 65% to 75% solids. The nozzle speed is also adjustable. If a rotating nozzle is used, the adjustment serves the objectives of providing fast water stream speeds to maintain a clean grate during start up and early discharge, and to provide for slower speeds so as to compensate for increased peripheral speed as the working range of the stream enlarges, to thereby maintain the peripheral or traversing movement of the water within the range of maximum effectiveness.

Referring particularly to FIG. 12, there is shown a modified embodiment of the present invention in which the height of the head is established remotely and in a continuously variable manner. Since the embodiment of FIG. 9 is so similar to that of FIGS. 2–8, like parts will be given like numbers primed. Thus, the inner bottom 37' is formed with a sump 61' and a grate 83' in a manner similar to that previously disclosed. The sump is provided with inclined converging walls which terminate in a bottom 75' through which is connected a slurry discharge line 95' closable by a suitable gate valve 96'. Centrally disposed through the bottom is an opening 77' carrying a flanged neck 81' for carrying a packing or seal 125' and housing 123' in the same manner as previously disclosed in connection with FIGS. 2–8. A suitable hydraulic motor 127' is connected to a shaft 103' splined or keyed to a sleeve (not shown) mounted in bearings by suitable gearing so that the shaft can move linearly through the sleeve. The lower end of the shaft terminates in a rotary union 105' which is connected through an elbow 141 and flexible hose 137' to a high pressure water piping 134'. Elbow 141 is provided with a projection to which is connected the arm 142 of linear actuator 143, such as a hydraulic piston 145 and cylinder 147. The other end of the actuator is mounted to a framing member 145 of the ship. The actuator is connected through piping 149 and a suitable reversing valve (not shown) to a source of hydraulic fluid under pressure such as the high pressure water system 108 or other suitable supply. As the actuator is operated, it exerts upward or downward force on the elbow to thereby move the shaft upwardly and downwardly, the latter sliding within the sleeve.

In operation, the nozzles at the upper end of the shaft may be moved to a lowermost position where they revolve to slurrify and clear out the sump in the initial stages. Thereafter, the shaft is pushed upwardly by operation of the actuator and continues to clear a path so that it may continue to move upwardly to a level above the grating at which point it is adjusted for optimum slurry formation. The central section 89' or element of the grating is inclined to form a diverging cone which opens upwardly and deflects the water jet or stream to aid in clearing a channel through which the head may move. After the slurry has been discharged, the head is lowered by reversing the actuator as it lowers the stream and serves to flush out the remaining residue of slurry and particulate matter out of the sump.

Referring now to FIGS. 13 through 22, there is shown an alternate embodiment of the present invention which is characterized by intermittent rotary operation and driven by a linear actuator off of the high pressure water supply. In this way, the operation of the device is made to depend upon a single source of high pressure water. Additionally, this embodiment is provided with self-opening nozzles which are actuated into an open position by an application of the high pressure water. By providing self-closing nozzles, difficulties experienced with plugging of nozzles are minimized.

Figure 17:
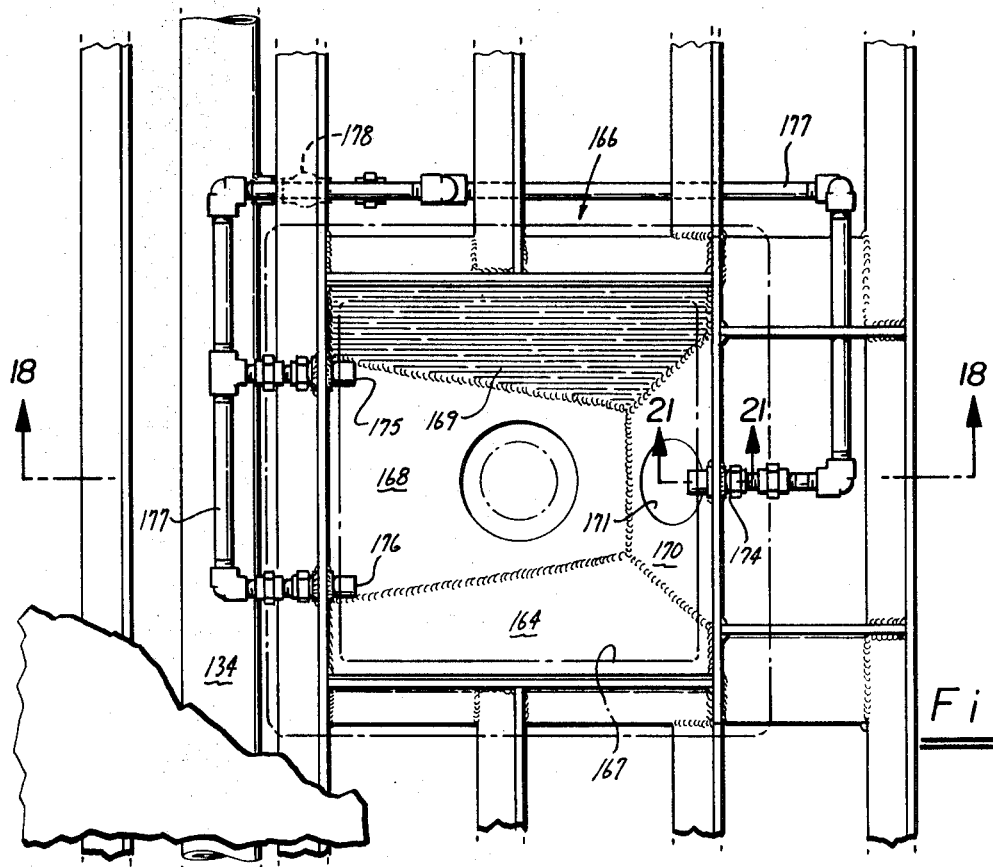
FIG. 17 is a top plan view of a sump arrangement and flushing nozzles taken generally along the lines 17—17 of FIG. 13.
Figure 18:
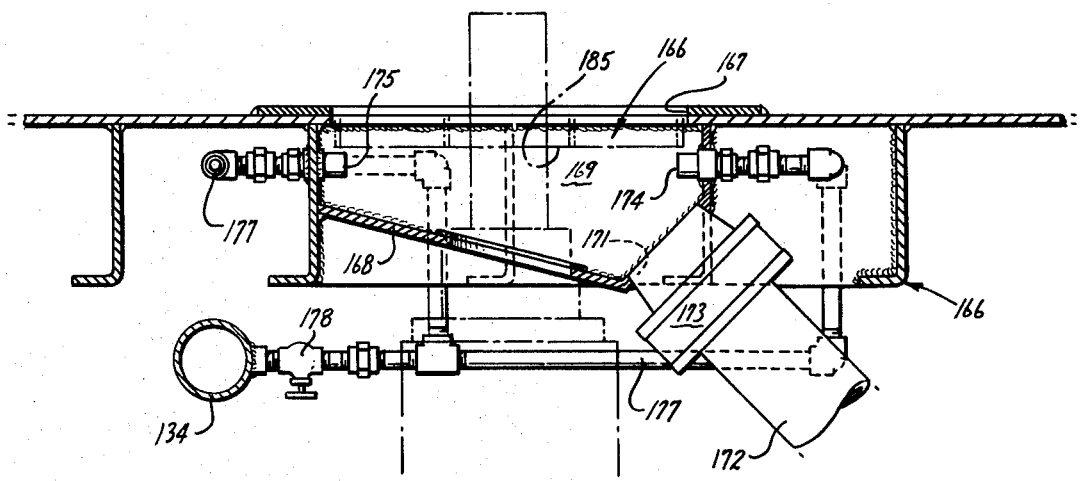
FIG. 18 is a cross-sectional view taken along the lines 18—18 of FIG. 17.

As shown in FIGS. 13, 17 and 18, there is provided a sump 166 which communicates upwardly through an opening 167 formed in the inner bottom of the vessel. The sump is constructed of a bottom wall 168 and side and end walls 169, 170, the bottom wall converging or sloping downwardly towards a discharge opening 171 formed in end wall 170. The discharge opening faces generally upwardly and toward the middle of the sump and is connected to a discharge pipeline 172 through a suitable gate valve 173. As shown, the interior of the sump is relatively small and shaped to facilitate flushing of slurry into the discharge line.

The sump is provided with three flushing nozzles 174, 175, 176 which are connected through piping 177 and valve 178 to the high pressure water supply 134. One of the nozzles is located immediately above the discharge opening while the other nozzles are located in the opposite end wall. Detailed construction of each of the flushing nozzles is shown in FIGS. 21 and 22 and consists of a cylindrical shell 179 forming a chamber having a restricted opening at one end through which is passed a plunger 180 attached to a piston head 181 contained within the chamber. The piston head 181 is biased by a suitable spring 182 against a mechanical stop 183 to establish a closed position of the nozzle as shown in FIG. 21. When high pressure water is supplied to the nozzle, it acts upon the piston head to compress the spring and force the plunger outwardly, as shown in phantom lines in FIG. 21. Ports 184a, b, c are provided through the head and extend laterally outwardly at an angle to the plunger. As shown in FIG. 22, the nozzle ports 184 are directed to provide a plurality of streams diverging away from each flushing nozzle. When the pressure is sufficiently reduced, the spring automatically retracts the plunger to close the ports.

The opening in the inner bottom is covered by a grate 185 with which can be constructed as hereinbefore explained in connection with grate 83. However, the equally spaced bars 91 may instead take the form of ¼" diameter rods spaced on 1½"–2" centers.

Referring now particularly to FIGS. 13 through 16, there is shown in detail the means for forming a traversing water jet or stream of the present embodiment which is generally similar in arrangement to that previously explained in connection with FIGS. 6 and 7. Such means include a hollow shaft 203, the lower end of which terminates and rotates in a rotary union 205 which effects a seal with the high pressure water coupling 207 while permitting the shaft to turn. Coupling 207 is connected to a high pressure water supply 208 which develops a head of about 250 to 450 pounds per square inch. The upper end of shaft 203 is closed by an end plate 210 so that rotation of the shaft is free and presents no projections which could interfere with the surrounding solid material. The upper end of the shaft encloses a self-closing nozzle head 218 to be more fully described hereinafter in detail.

At its lower end, shaft 203 is keyed or splined to a sleeve 218 set on a bearing 219, which is mounted in a housing 223 secured to a lower side of the bottom wall of the sump 166 and vertically aligned with an upper bearing 221 whereby the shaft extends upwardly through the sump and through a cylindrical opening 224 provided in the grating. The height of the shaft and associated nozzle head is controlled by jack screws 300 at a level above the grate preferably so that the main water nozzle is at a level of about six inches above the grate. A suitable seal 225 is provided between the upper bearing and the sump to thereby seal out any abrasive material and silt.

Shaft 203 is rotated by means of a positive displacement linear actuator 227, the output of which is connected to the sleeve 203 through a drive arm 228 attached by a clevis 229 to a plate 230 rotatably mounted on a bearing 231 such that it is free to rotate about shaft 203. A ratchet gear 232 is secured to the shaft and is engaged by a pawl 233 carried on the plate and urged into engagement with the gear by a leaf spring 234.

The detailed construction of the linear actuator is shown more fully in FIGS. 15 and 16 and consists generally of a housing 241 enclosing a piston 242 carrying a piston rod 243 at one end which passes through a rod bearing to outside the housing. The piston is urged by a compression spring 244 into a position withdrawing the piston rod. The piston 242 is captured with an extensible diaphragm 245 having a shape which permits portions thereof to form a folded seal about the side wall of the piston when the same is at the upper limit of its travel. Such linear actuators are known and, for example, can be obtained from the Bellofram Corporation of Burlington, Mass. When operated, the piston is displaced by fluid pressure downwardly against the force of spring 244. The displacement is positive in nature and continues until the piston reaches a lower limit of travel defined by stops not shown. After the driving fluid force is removed, the piston is returned to its upward position by the compressed spring.

Means are provided for controlling the piston and consists of a suitable spool valve 250 having inlet and outlet water connections (FIG. 14). The valve contains a spool 253 which slides back and force in a cylindrical chamber 254, the limit of travel at each end being defined by limit washers 254, 255 set on a rod forming extension axially of the spool in each direction. In the position shown in the the drawing, the limit washer 255 abuts one side of the valve so that a passage 256 through the spool establishes input connection between an actuator passageway 257 to the actuator and the high pressure inlet line. In the opposite position, where limit washer 254 contacts the valve, another passageway 258 establishes an outlet connection from the actuator passageway 257 to the outlet piping.

Means are carried on the rod at one end of the spool for causing the same to flip back and forth at the extremes of piston travel. This means is constructed and arranged to pass between valve operating positions with a minimum of intervening dwell and includes a cage 260 carrying a valve actuating rod 261. The actuating rod 261 extends through an opening in a valve actuating arm 262 which is fixedly carried on the actuator piston rod 243. The actuator rod 261 carried a pair 263, 264 of spaced limit stops which are adjusted so that one of the limit stops is engaged by the arm 262 at each limit of travel of the piston back and forth in the cylinder.

Captured within the cage is an additional washer 267 carried on the end of the spool rod. As shown, when the arm 262 is carried by the travel of the piston to the top of its return stroke, limit 263 is driven to carry the valve actuating rod in a position such that one end of the cage drives the washer 255 to thereby push the spool 253 into the inlet position. As the incoming fluid drives the piston to the bottom of its stroke, the arm 262 is carried into contact with the other limit 264 which pulls the cage into contact with the captured washer 267 and to pull the spool into the outlet position.

In order to speed up the action, an over-center spring-biased arrangement is provided as shown in FIG. 16 whereby compression springs 270, 271 are pivotally mounted on each side of the cage and to fixed pivot mountings 273, 274. Movement of the cage through a mid-position causes the springs to be further compressed whereby upon over center travel of the cage with respect to the pivot points of the spring mountings the cage is snapped across and into the other position with a minimum of dwell during passage.

Referring now particularly to FIGS. 19 and 20, the head of the water jet assembly is shown in detail. The head includes as one portion thereof the cylindrical recess 280 of the upper end of the shaft 203. Nested and captured within recess 280 is a cylindrical sleeve 281 which is closed at its upper end to form a piston 282 adapted for sliding motion in shaft 203. A captured spring is compressed between the end plate 210 of shaft 203 and the head of piston 282 to thereby urge the same into a downward position against a stop ring 283. Near its upper end, the piston carries through its side wall a nozzle 285 of a type which can deliver a high force, high velocity water jet for providing pulping action. An additional nozzle 286 is carried through the sleeve at its lower end. Nozzle 286 is smaller and is used to provide a cleanup function immediately above the grate. Each of nozzles 285, 286 is encircled by an O-ring seal 287, 288 lying on an oval path in the curve between the sleeve 203 and the inside wall of the shaft. Additional circular O-rings 289, 290, 291, 292 are mounted at spaced locations in annular spaces along the wall of the sleeve for providing suitable seals with the shaft.

Rotation of the sleeve within the shaft is prevented by a slot 294 which extends axially through the wall of the sleeve and which is engaged by a pin 295 which passes through the shaft wall. In order to provide lubrication between the sleeve and shaft, a grease fitting 296 is provided which communicates with an annular recess 297 located about the sleeve between the upper O-ring seal 289 and the seal 287 for the main nozzle 285.

Grate 185 is made in such a manner that it can be removed and replaced with a solid, flat plate whenever the nozzle head is lowered by adjustment of screw jacks 300. When each sump of a hold has been so fitted with a plate, that hold is again suitable for containing oil or other cargo. In this way, a ship constructed according to the present invention is suitable for multicargo use as an ore-slurry- or oil ship.

The pulping device of FIGS. 13 through 22 operates as follows. Assume that the device is installed in the hold of the ship which has been filled with a slurry which has settled and it is desired to repulp such said slurry and to discharge the same. Initially water pressure is supplied to the flushing nozzles 174 through 176 to establish flow through the discharge lines. After the initial flow is established the high water pressure is switched to the main jets via piping 208. Additional piping serves to connect the input line 251 of the water motor 227 to the high pressure water source in parallel to piping 208 so that the motor is energized at the same time that high pressure water is supplied to the pulping unit.

At the head, in the absence of water pressure, the sleeve and piston drop in response to the action of the spring until it rests in a downward position against limit stop ring 283. As high pressure water is supplied the unit is self-opening since the water pressure drives the piston and sleeve upwardly against upper stops 350, 351, the entrapped liquid or air being displaced through a relief passageway 353. At the upper limit of its travel the piston carries the nozzles 285, 286 into alignment with openings 354, 355 provided in the wall of the shaft to thereby permit water to flow through the nozzles and develop the water jet streams. When the water pressure is turned off, the sleeve slides downwardly under the influence of the compressed spring to its lower position and thereby carries the nozzles downwardly and away from the shaft wall openings which are then closed by the adjacent wall of the shaft sleeve. In this way, the action of the sleeve serves to close off access to the nozzles and prevent their becoming plugged by foreign matter.

Whenever high pressure water is applied to the pulper head, the linear actuator is also positively driven in such a manner that the piston 245 is pushed against the spring 244 and thereby carries the plate and pawl 233 into engagement with the ratchet gear 232 to turn the shaft 203 through an increment of arc. Subsequently, the water pressure is cut off by the spool valve and the returning spring forces the water above the head through outlet connection 256 into the discharge line 252. The cycle is then repeated step-by-step and the shaft is thereby incrementally rotated and traverses the high pressure pulping jet and associated pulping zone across the load.

The effect of the pulping jet upon the material to be pulped is substantially the same as that previously described. During the short interval when the jet stream is stationary, there is an additional effect that the stream can bore further into the material to be pulped. In this way, the stream traverses and simultaneously pulps the solids as it is moved by the linear motor. During the return stroke the stream is stationary and penetrates more deeply into the material before again traversing through the next segment of rotation. It is found that with the present device, rotation speeds of from about ¼ to 2 r.p.m. are suitable and that a very pulping action is obtained. The pulping action of the present embodiment as well as the previous embodiment are characterized by creating a pulping zone in which material is pulped by high pressure water jet action and by movement of this zone progressively over an area overlying substantially the entire reach of the stream's influence. Eventually so much material is reslurrified that the load above fall in and the energy associated in falling or block caving adds to that required for pulping. Thus, gravity is used to help the pulping as material falls to the bottom of the vessel as well as being a principle force in removing freshly formed slurry to and through the sumps.

Referring now to FIGS. 23 to 25, there is shown one form of shore installation utilizing the principles of the present invention and suitable for carrying out the foregoing method. Thus, there is provided an elongate storage facility 310 which rests in a trench formed in the ground. The facility includes a bottom wall 314 and generally vertical side walls 316, 317, the upper portion of which is directly vertical and the lower portion of which is inclined downwardly and inwardly towards the bottom wall as shown in FIG. 25.

Means are provided for establishing transverse 318 through 326 walls, the end ones 318, 326 of which serve as end walls to the facility. The middle transverse wall 322 extends downwardly to bottom wall to thereby subdivide the facility into two halves. By so doing, one half or the other may be selectively cleaned and totally emptied of material without affecting the other portion of the facility. The remaining transverse walls extend to within a few feet of the bottom wall and thereby define a gap through which some interaction takes place between the lowermost portions of the volumes defined by walls 318 through 326.

Pulping means 330 through 337 are provided at in the bottom wall and located centrally within each volume for repulping slurry solids within that volume. Such means are diagrammatically shown in FIGS. 24 through 25 because of the general scale of the drawing. However, such means consists of any of the pulping means heretofore disclosed, including the rotored water jet and sump arrangement connected to a high pressure water source. The output of each sump is taken through an associated valve to a collecting hopper 339 from which the slurry is pumped. Beneath the bottom wall and along the path of the various pipelines, tunneling is provided for gaining access to the lowermost portions of each of the slurry sumps for required servicing.

Figure 26:
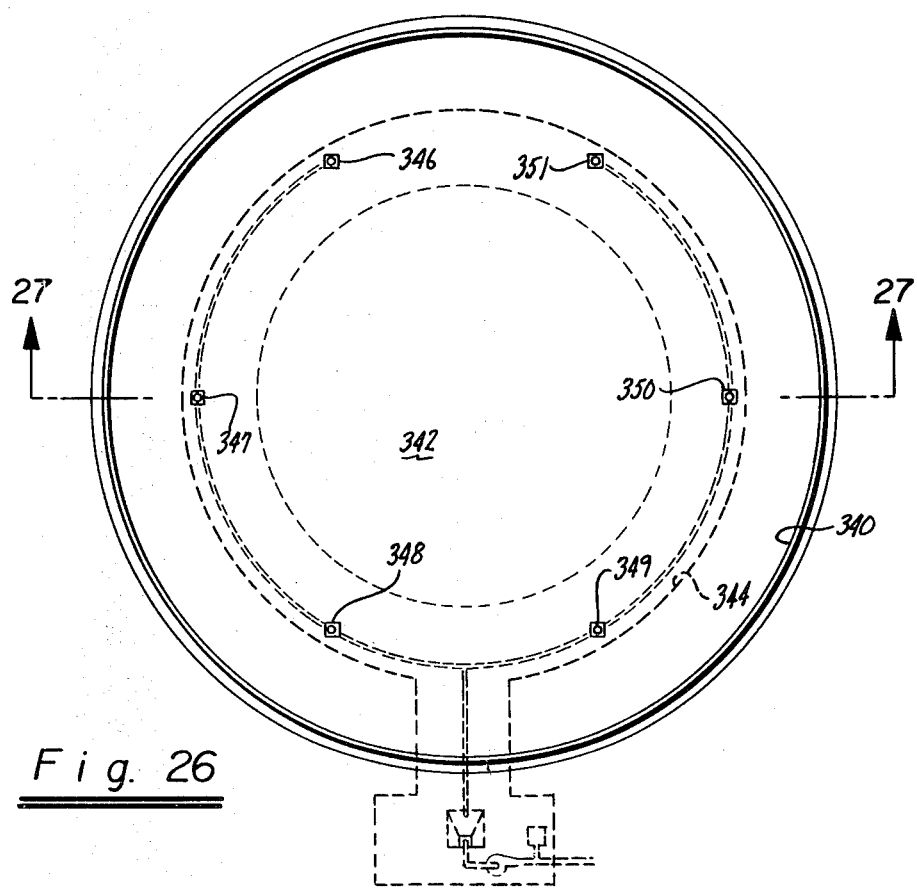
FIG. 26 is a top plan view of a shore based installation constructed in circular form in accordance with the present invention.
Figure 27:
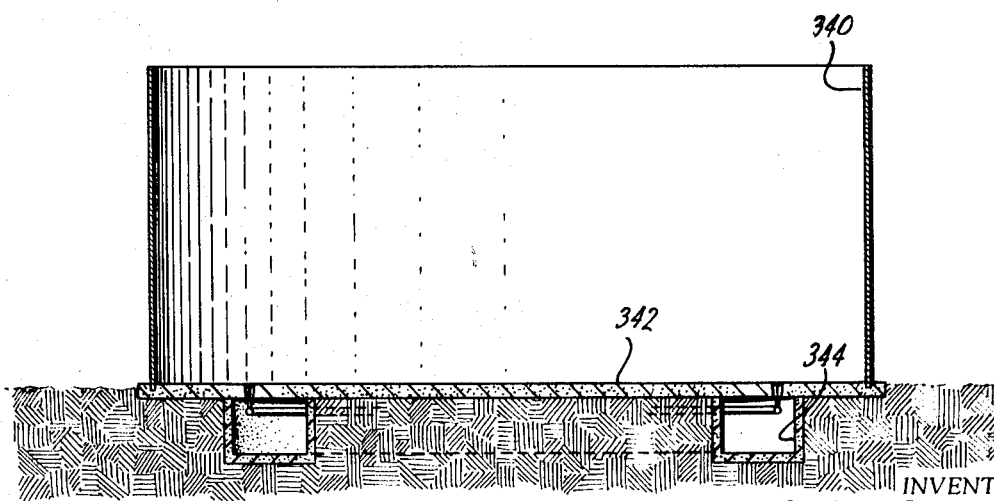
FIG. 27 is a cross-sectional view taken along the lines 27—27 of FIG. 26.

Another suitable shore installation is shown in FIGS. 26 and 27 which illustrates a form of tank particularly suitable as a holding or storage tank for dewatered slurries. This tank takes the form of a round vessel 340 simply constructed and set on a base 342 of, for example, concrete which rests upon the ground surface. A tunnel 344 is provided beneath the bottom surface of the tank and takes the form of a generally annular ring lying along a mid circumference and concentric with respect to the vessel.

Means are provided for establishing pulping units 346, 351 through the floor of the tank at spaced positions about the tunnel such that the spacing between each unit, the adjacent wall, and the remaining units is roughly comparable. In this way, the entire region or zone above the bottom wall is within the potential repulping action of one of the units. The output of each unit is taken by gravity through suitable discharge piping to a collection sump from which it is discharged through a suitable pumping equipment. Pulping units are connected to high pressure water and are constructed as shown previously except for the addition of mounting rings (not shown) set in the concrete base for receiving the respective sump.

The operation of these shore installations directly follows that of the pulping apparatus previously explained and of the method they carry out.

Thus, there has been disclosed a new system for the slurrification system for shipboard use which is particularly adapted for the reslurrification and discharge of settled ore solids. The present system greatly facilitates the offshore loading and unloading of ore carriers slurry techniques even with highly compacted ore cake. While preferred method and apparatus have been disclosed herein, it is to be understood that certain departures from these disclosures can be practiced without departing from the spirit and scope of the invention. For example, while there has been disclosed herein a nozzle arrangement particularly suited for continuous and step-by-step rotation, it will be understood that either oscillating and linearly moving nozzles might have application for some purposes, as where the nozzle must be located in a corner or against a wall. As shown, the pulping units are applicable to both shore ship installations and the term vessel, or the like, as used herein, is meant to refer to either type of installation.

In addition to the motor drives disclosed herein, many other drives could be substituted. For example, instead of a one-way drive, spring return motor 277, a double acting unit could be easily employed. If so used, the spent water from the motor is ejected at high velocity and can be directed through a check valve and nozzle along the slurry discharge line. The resultant pulsating water jets so introduced serves to aid in keeping the discharging slurry flowing.

We claim:

1. A method for repulping and removing settled particulate mineral ore solids characterized by being dispersible into a pumpable slurry, said solids being disposed in a vessel having a substantially horizontal bottom wall, a discharge sump formed in said bottom wall, and a grating covering said sump, comprising the steps of directing a high velocity liquid stream into said solids at a level immediately above said bottom and substantially parallel thereto from a position located within the body of solids to disperse and resuspend the solids impacted by said stream within a pulping zone defined by the action of said stream, progressively shifting stream so that it traverses into contact with adjacent solids, simultaneously withdrawing reformed slurry through said sump formed in the bottom wall as it flows away from the point of resuspension so that no standing liquid or slurry is developed which would flood the zone so that a path is maintained between the solids being impacted and the source of said stream, which is substantially unimpeded by flooding of the zone, continuing the preceding steps into a continually increasing area until the material above the removed material collapses and is successively removed to thereby empty the vessel.

2. A method as in claim 1 in which said stream is directed laterally and is progressively shifted to act over substantially the entire area above the bottom wall.

3. A method as in claim 1 in which said stream is discharged from at least one region located inwardly from the sides of the vessel and is shifted by rotation.

4. A method as in claim 3 in which the rotation is step by step.

5. A method as in claim 3 in which the rotation is substantially continuous.

6. A method as in claim 1 in which unpulped masses of material are retained in the pulping zone until reduced to form a slurry.

7. A method as in claim 1 in which said mineral solids consist of iron ore and said liquid is substantially water and further including the step of varying the amount and pressure of applied water to a value at which the solids concentration of the resultant slurry is from about 55% to 75%.

8. A method as in claim 7 in which the water is limited to a value at which the solids concentration is about 70%.

9. A method as in claim 1 in which the step of directing a high velocity liquid stream is carried out simultaneously from a number of locations.

10. A method as in claim 1 in which said liquid stream is moved by repeatedly rotating it through 360°, at slow speed.

11. A method as in claim 10 wherein said speed is between about ¼ to 6 revolutions per minute.

12. Apparatus for the storage and pulping of discrete mineral solids comprising a vessel in which the mineral solids can be stored as a compact mass, the vessel having a bottom wall which is substantially flat and horizontal, at least one sump communicating with the interior of the vessel through the bottom wall, a grating covering said sump and lying substantially flush with said bottom wall and pulping means disposed in the vessel adjacent said bottom wall for progressively pulping discrete solids in a zone immediately overlying the bottom wall, said means comprising at least one nozzle adapted to discharge a high energy water jet into said zone and over the bottom wall from a position above said grating, means for mounting said nozzle and for moving the same to progressively redirect the nozzle to move said jet over adjacent areas of said bottom wall, and discharge piping connected to said sump and serving to remove freshly formed slurry or partially formed slurry to thereby prevent accumulation of standing water or slurry and consequent flooding of said zone.

13. Apparatus as in claim 12 in which said mounting means consists of a rotatable head, and power means for rotating said head.

14. Apparatus as in claim 13 in which the power means serves to rotate the head step by step.

15. Apparatus for the storage and pulping of discrete mineral solids comprising a vessel in which the mineral solids can be stored as a compact mass, the vessel having a bottom wall, at least one sump communicating with the interior of the vessel through the bottom wall, a grating covering said sump and pulping means disposed in the vessel adjacent said bottom wall for progressively pulping discrete solids in a zone immediately overlying the bottom wall, said means comprising at least one nozzle adapted to discharge a water jet into said zone and over the bottom wall from a position above said grating, means for mounting said nozzle and for moving the same to progressively redirect the nozzle to move said jet over adjacent areas of said bottom wall, said sump being provided with a plurality of flushing nozzles, each of said flushing nozzles being constructed to be activated by water pressure to open the same and containing means for closing the same when said water pressure is absent.

16. Apparatus as in claim 15 wherein each of said flushing nozzles includes a cylindrical shell mounted through a wall of said sump and having a cylindrical recess therein, a nozzle plunger disposed in said shell and having a rear surface forming a piston in said cylindrical recess for driving the same in response to water pressure, spring means for biasing said nozzle plunger to a recessed position within said shell.

17
17. Apparatus as in claim 16 wherein said shell is provided with a passageway opening adjacent the interior of said sump and having a length sufficient to accommodate a portion of said plunger, and wherein said plunger is provided with outlet orifices about its perimeter whereby when the said plunger is retracted into said shell said orifices are closed by the walls of said passageway.

18. Apparatus as in claim 13 further including intermittent motion means for driving said head to move the same progressively and thereby move the pulping zone across and about the bottom of said vessel.

19. Apparatus as in claim 18 wherein said intermittent motion means consists of a linear actuator having an arm for delivering reciprocating motion therefrom, means connecting the output of said actuator to said head so that successive strokes of said actuator operate to intermittently move said head progressively about a predetermined arc.

20. Apparatus as in claim 19 wherein said rotatable head is set on a shaft mounted in bearings and said means for connecting the output of said actuator to said head comprises ratchet gear means carried by said shaft, a pawl, a drive plate mounted for rotation with respect to said ratchet gear means, said drive plate carrying said pawl and spring means for yieldably urging said pawl into contact with said ratchet gear.

21. Apparatus as in claim 13 wherein said power means includes a motor having a rotating shaft output, and a worm and wheel drive connects said rotating shaft output to said head for continuously rotating the same.

22. Apparatus for repulping and removing settled solids characterized by being dispersable into a slurry, a vessel containing said solids and having a substantially flat bottom and substantially vertical walls, means for directing a high velocity water stream into said solids at a level immediately above said bottom and substantially parallel thereto from a position within said solids to disperse and resuspend the solids impacted by said stream within a pulping zone immediately overlying the bottom wall, means for moving said stream so that it traverses into contact with adjacent solids whereby said pulping zone is moved over substantially the entire area above said bottom wall that is reachable with said stream, a sump formed in the bottom wall and covered by a grating for simultaneously withdrawing reformed slurry through the bottom as it flows away from the point of resuspension so that no standing water or slurry is accumulated which would flood the zone and a substantially unimpeded path is maintained between the solids being impacted and the said water stream so that repulped solids are removed in a continually increasing area until the solids material above the removed material collapses and is successively removed.

23. An apparatus for pulping discrete solid particles with a water jet, a sump for withdrawing slurry, a water jet distribution head, means mounting said head for rotation adjacent said sump, said head carrying at least one nozzle for creating a water jet and for directing it into adjacent solids, said head comprising an outer shaft having a cylindrical recess therein, said shaft having at least one opening therein for permitting a water jet to be sent therethrough, a nozzle means connecting said nozzle to high pressure water source means responsive to said high pressure water for moving said nozzle into alignment with said opening and for moving said nozzle away from said opening where said high pressure water is absent, and for closing said opening to prevent entry of foreign material into said head.

24. A slurry carrier for transportation of particulate matter in settled form and for repulping and discharging said matter as a slurry at destination comprising a ship having bulkheads and an inner bottom forming at least one watertight cargo hold therein for receiving ores and minerals, said inner bottom being substantially flat and horizontal, and said bulkheads being substantially vertical, at least one discharge sump formed below said inner bottom and having a bottom wall and sidewalls, a grating covering said sump and lying substantially flush with said inner bottom, means for forming a high energy water jet disposed immediately above said grating and moveable to traverse a path lying generally parallel to and immediately above said inner bottom, means for moving said jet means, and discharge piping connected through one wall of said sump and serving to remove freshly formed slurry or nearly formed slurry to prevent standing water or standing slurry from accumulating on said inner bottom.

25. A slurry carrier as in claim 24 in which said grating forms slots opening away from said sump to facilitate the entry of slurry.

26. A slurry carrier as in claim 24 further including a plurality of sumps positioned at spaced locations about the inner bottom, a grating covering each sump, and means for forming a high energy water jet in association with each of said sumps.

27. A slurry carrier for transportation of particulate matter in settled form and for repulping and discharging said matter as a slurry at destination comprising a ship having bulkheads and an inner bottom forming at least one watertight cargo hold therein for receiving ores and minerals, said inner bottom being substantially flat and said bulkheads being substantially vertical, at least one discharge sump formed below said inner bottom and having a bottom wall and sidewalls, a grating covering said sump and lying substantially flush with said inner bottom, means for forming a high energy water jet disposed immediately above said grating and moved to traverse a path lying generally parallel to and immediately above said inner bottom, said means forming a high energy water jet comprising a nozzle, and means for mounting said nozzle for movement and for concealing said nozzle from engagement with adjacent solids, and discharge piping connected through one wall of said sump and serving to remove freshly formed slurry or nearly formed slurry to thereby prevent standing water or standing slurry from accumulating on said inner bottom.

28. A slurry carrier for transportation of particulate matter in settled form for repulping and discharging said matter as a slurry at destination comprising a ship having bulkheads and an inner bottom forming at least one watertight cargo hold therein for receiving ores and minerals, said inner bottom being substantially flat and said bulkheads being substantially vertical, at least one discharge sump formed below said inner bottom and having a bottom wall and sidewalls, a grating covering said sump and lying substantially flush with said inner bottom, means for forming a high energy water jet disposed immediately above said grating and moved to traverse a path lying generally parallel to and immediately above said inner bottom, means for adjusting the elevation of said nozzle above said grating, and discharge piping connected through one wall of said sump and serving to remove freshly formed slurry or nearly formed slurry to thereby prevent standing water or standing slurry from accumulating on said inner bottom.

29. A slurry carrier as in claim 28 wherein said adjusting means is continuously variable to adjust said nozzle from a position within said sump to about 6 inches above said grate.

30. A slurry carrier for transportation of particulate matter in settled form and for repulping and discharging said matter as a slurry at destination comprising a ship having bulkheads and an inner bottom forming at least one watertight cargo hold therein for receiving ores and minerals, said inner bottom bein gsubstantially flat and said bulkheads being substantially vertical, at least one discharge sump formed below said inner bottom and having a bottom wall and sidewalls, a grating covering said sump and lying substantially flush with said inner bottom, means for forming a high energy water jet disposed immediately above said grating and moved to traverse a path lying generally parallel to and immediately above said inner bottom, and discharge piping connected through one wall of said sump and serving to remove freshly formed slurry or nearly formed slurry to thereby prevent standing water or standing slurry from accumulating on said inner bottom.

31. In apparatus for handling particulate matter in settled form and for repulping and discharging said matter as a slurry from a vessel having sidewalls and bottom wall, at least one discharge sump formed in said bottom wall, a grating covering said sump and lying substantially flush with said bottom wall, means for forming a high energy water jet disposed immediately above said grating and moveable to traverse a path lying generally parallel to and immediately above said bottom, said means forming a high energy water jet comprising a nozzle and means for mounting said nozzle for movement and for concealing said nozzle from engagement with adjacent solids, and discharge piping connected through one wall of said sump and serving to remove freshly formed slurry or nearly formed slurry to thereby prevent standing water or standing slurry from accumulating on said bottom.

32. In apparatus for handling particulate matter in settled form and for repulping and discharging said matter as a slurry from a vessel having sidewalls and a bottom wall forming a liquid watertight chamber therein for receiving said particulate matter, at least one discharge sump formed below said inner bottom and having a bottom wall and sidewalls, a grating covering said sump and lying substantially flush with said inner bottom, means for forming a high energy water jet disposed immediately above said grating and moved to traverse a path lying generally parallel to and immediately above said inner bottom, means for adjusting the elevation of said nozzle above said grating, and discharge piping connected through one wall of said sump and serving to remove freshly formed slurry or nearly formed slurry to thereby prevent standing water or standing slurry from accumulating on said inner bottom.

33. A method for repulping and removing settled particulate solids characterized by being dispersible into a pumpable slurry, said solids being disposed in a vessel having a bottom wall, a discharge sump formed in the said bottom wall, and a grating covering said sump and lying substantially flush with said bottom wall, comprising the steps of directing a high velocity liquid stream into said solids at a level immediately above said bottom wall and substantially parallel thereto from a position located within the body of solids to disperse and resuspend the solids impacted by said stream within a pulping zone defined by the action of said stream, progressively shifting said stream in a rotating pattern so that it traverses into contact with adjacent solids, simultaneously wihdrawing reformed slurry through said sump formed in the bottom wall immediately below said rotating stream as it flows away from the point of resuspension so that no standing liquid or slurry is developed which would flood the zone so that a path is maintained between the solids being impacted and the source of said stream which is substantially unimpeded by flooding of the zone, continuing the preceding steps into a continually increasing area until the material collapses and is successively removed to thereby empty the vessel.

References Cited
UNITED STATES PATENTS

| | | | |
|---|---|---|---|
| 1,564,805 | 12/1925 | West | 214—15B |
| 2,957,493 | 10/1960 | Nilsen | 302—16 |
| 3,305,106 | 2/1967 | Ishino | 302—14 |
| 3,316,023 | 4/1967 | Koranda | 302—16 |

ANDRES H. NIELSEN, Primary Examiner

U.S. Cl. X.R.

302—66